US009403922B2

(12) United States Patent
Sumida et al.

(10) Patent No.: US 9,403,922 B2
(45) Date of Patent: Aug. 2, 2016

(54) CONTINUOUS POLYMERIZATION DEVICE, METHOD FOR PRODUCING POLYMER COMPOSITION, AND INJECTION VALVE

(71) Applicant: SUMITOMO CHEMICAL COMPANY, LIMITED, Tokyo (JP)

(72) Inventors: Masakazu Sumida, Ehime (JP); Kazuhiro Yamazaki, Ehime (JP); Akira Nishitani, Ehime (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/764,890

(22) PCT Filed: Jan. 15, 2014

(86) PCT No.: PCT/JP2014/051159
§ 371 (c)(1),
(2) Date: Jul. 30, 2015

(87) PCT Pub. No.: WO2014/119432
PCT Pub. Date: Aug. 7, 2014

(65) Prior Publication Data
US 2016/0009831 A1    Jan. 14, 2016

(30) Foreign Application Priority Data
Jan. 31, 2013   (JP) ................................ 2013-017323

(51) Int. Cl.
*C08F 2/01*        (2006.01)
*B01J 19/18*       (2006.01)
(Continued)

(52) U.S. Cl.
CPC ............. *C08F 20/10* (2013.01); *B01J 19/1862* (2013.01); *B01J 19/245* (2013.01); *C08F 2/01* (2013.01);
(Continued)

(58) Field of Classification Search
CPC ................... C08F 2/01; B01J 19/1862; B01J 2219/00103; F16K 21/02; F16K 1/36
USPC ........................................ 526/65; 251/63, 324
See application file for complete search history.

(56) References Cited

U.S. PATENT DOCUMENTS 6,214,942 B1 *  4/2001  Siol ........................ C08F 6/005
                                                    526/328
6,632,907 B1 * 10/2003  Mizota ................ B01J 19/0053
                                                    526/258

(Continued)

FOREIGN PATENT DOCUMENTS

EP    2 481 476 A1    8/2012
EP    2 481 477 A1    8/2012
(Continued)

OTHER PUBLICATIONS

International Search Report (English & Japanese versions), PCT/JP2014/051269, Mailed: Mar. 25, 2014, 5 pages.
(Continued)

*Primary Examiner* — Fred M Teskin
(74) *Attorney, Agent, or Firm* — Rothwell, Figg, Ernst & Manbeck, P.C.

(57) ABSTRACT

A continuous polymerization apparatus uses at least a first reactor and a second reactor (10, 20). Each of the reactors (10, 20) comprises a supply port (11a, 21a) and an effluent port (11b, 21b). The supply port (11a) of the first reactor (10) is connected to supply sources (1, 3) of a raw material monomer and a polymerization initiator, and the effluent port (11b) thereof is connected to the supply port (21a) of the second reactor (20) by a connection line (15a). The connection line (15a) is combined with a replenishing line (15b) through an injection valve (50) at a combining part. The injection valve (50) comprises, in a full closure state thereof, a clearance that may cause a fluid comprising at least the raw material monomer to flow from the replenishing line (15b) to the connection line (15a).

21 Claims, 4 Drawing Sheets

(51) Int. Cl.
  *B01J 19/24* (2006.01)
  *F16K 1/36* (2006.01)
  *F16K 21/02* (2006.01)
  *C08F 20/10* (2006.01)

(52) U.S. Cl.
  CPC .......... *F16K 1/36* (2013.01); *B01J 2219/00058* (2013.01); *B01J 2219/00103* (2013.01); *B01J 2219/24* (2013.01)

(56) References Cited

U.S. PATENT DOCUMENTS

| | | |
|---|---|---|
| 2004/0192844 A1 | 9/2004 | Ikematsu et al. |
| 2005/0183670 A1 | 8/2005 | Grantham et al. |
| 2009/0048407 A1 | 2/2009 | Barbieri et al. |
| 2011/0152564 A1 | 6/2011 | Fujiwara et al. |
| 2013/0041117 A1 | 2/2013 | Hayashida et al. |
| 2014/0329981 A1 | 11/2014 | Sato et al. |

FOREIGN PATENT DOCUMENTS

| | | | |
|---|---|---|---|
| EP | 2 500 363 A1 | | 9/2012 |
| EP | 2500363 A1 | * | 9/2012 |
| JP | 1-172401 A | | 7/1989 |
| JP | 5-331212 A | | 12/1993 |
| JP | 7-118431 A | | 5/1995 |
| JP | 11-189667 A | | 7/1999 |
| JP | 2000-506918 A | | 6/2000 |
| JP | 2000-507634 A | | 6/2000 |
| JP | 2003-82004 A | | 3/2003 |
| JP | 2004-27180 A | | 1/2004 |
| JP | 2004-211105 A | | 7/2004 |
| JP | 2008-184575 A | | 8/2008 |
| JP | 2010-84127 A | | 4/2010 |
| JP | 2010270396 A | | 12/2010 |
| JP | 2011-132300 A | | 7/2011 |
| JP | 2012-153805 A | | 8/2012 |
| JP | 2012-153807 A | | 8/2012 |
| JP | 2012-207203 A | | 10/2012 |
| JP | 2013-127048 A | | 6/2013 |
| KR | 10-0689598 B1 | | 2/2007 |
| WO | 97/36942 A | | 10/1997 |
| WO | 2011111134 A1 | | 9/2011 |
| WO | 2011/125980 A1 | | 10/2011 |
| WO | 2011129043 A1 | | 10/2011 |
| WO | 2011148750 A1 | | 12/2011 |
| WO | 2012043258 A1 | | 4/2012 |
| WO | 2012124564 A1 | | 9/2012 |

OTHER PUBLICATIONS

PCT International Preliminary Report on Patentability dated Aug. 4, 2015, English and Japanese versions, PCT/JP2014/051159, International Filing Date Jan. 15, 2014, Priority date Jan. 31, 2013, Applicant: Sumitomo Chenical Company, Limited, 9 pages.

Japanese Official Action with partial English translation dated May 17, 2016, Notification of Reason(s) for Rejection, Japanese Application No. 2013-017323, 8 pages.

* cited by examiner

CONTINUOUS POLYMERIZATION DEVICE, METHOD FOR PRODUCING POLYMER COMPOSITION, AND INJECTION VALVE

CROSS-REFERENCE TO RELATED APPLICATION

The present application is a national stage filing under 35 U.S.C. §371 of International Application No. PCT/JP2014/051159, filed on 15 Jan. 2014. The present application also claims priority under 35 U.S.C. §119 to Japanese Patent Application No. 2013-017323 filed on 31 Jan. 2013.

TECHNICAL FIELD

The present invention relates to a continuous polymerization apparatus, that is, an apparatus to continuously conducting a polymerization. The present invention also relates to a production method of a polymer composition conducted by using of the continuous polymerization apparatus. The present invention further relates to an injection valve.

BACKGROUND ART

Resin compositions such as a methacrylic ester polymer are obtained from a polymer composition produced by a continuous polymerization according to which a raw material monomer, a polymerization initiator, etc., are continuously supplied to a reactor to be polymerized. A continuous solution polymerization method using a solvent (or a dispersion medium, that will also apply hereinafter) to conduct a continuous polymerization, and a continuous bulk polymerization method using no solvent to conduct a continuous polymerization are known as the continuous polymerization methods.

A continuous polymerization apparatus is known that uses two reactors connected in series to each other, to conduct a continuous polymerization using the production method of a polymer composition. Patent Document 1 proposes a production method according to which the most part of the polymerization is conducted in the pre-stage reactor, and the polymerization is completed and the polymerization initiator, and the like, are removed in the post-stage reactor, and describes that the post-stage reactor is supplied with an additional comonomer, and, when necessary, an additional chain transfer agent through a delay addition line. Patent Document 2 proposes another production method according to which the polymerization is conducted to some extent in the pre-stage reactor, and a solvent is added to the content in the post-stage reactor to conduct a polymerization, and describes that, when necessary, the post-stage reactor is supplied with an additional copolymerizable vinyl compound and chain transfer agent through an additional raw material line. Patent Document 3 proposes a production method according to which the reactors are configured in two stages and the average residence time for each of these reactors is set to be within a predetermined range for a half-life period of the polymerization initiator, and describes that the monomer mixture in the raw material composition may be supplied to the pre-stage reactor while a part thereof may be side-fed to the post-stage reactor. Patent Documents 1 to 3 all relate to a continuous solution polymerization method.

PRIOR ART DOCUMENTS

Patent Documents

Patent Document 1: Japanese Laid-Open Patent Publication No. 01-172401
Patent Document 2: Japanese Laid-Open Patent Publication No. 05-331212
Patent Document 3: Japanese Laid-Open Patent Publication No. 2004-211105

SUMMARY OF INVENTION

Problems to be Solved by the Invention

Recently, uses of resin compositions such as a methacrylic ester polymer have been increasingly expanded, and various types of quality are demanded to the polymer composition according to the use thereof. A demand is growing for a high quality polymer composition (for example, a polymer composition excellent in the physical properties such as heat resistance and thermal stability, and having less impurities contaminated therewith), while a polymer composition with quality that is not so high is also demanded. The continuous polymerization apparatuses and the production methods of a polymer composition disclosed in Patent Documents 1 to 3 are, however, not suitable for producing such polymer compositions with different levels of quality.

The object of the present invention is to provide a novel continuous polymerization apparatus and a production method of a polymer composition that can be conducted using the continuous polymerization apparatus and that can produce the polymer compositions with different levels of quality. Another object of the present invention is to provide an injection valve usable for the continuous polymerization apparatus.

Means for Solving Problems

The inventors considered that, for a continuous polymerization apparatus using a first reactor and a second reactor connected in series to each other, the apparatus is operated switching between the case where the continuous polymerizations are conducted in both of the first and the second reactors to obtain the polymer composition in two stages (hereinafter, also referred to as "two-stage polymerization operation") and the case where the continuous polymerization is conducted in one stage only in the first reactor and the composition obtained thereby (an intermediate composition) is caused to continuously pass through the second reactor without any polymerization (hereinafter, also referred to as "one-stage polymerization operation"). According to the two-stage polymerization operation to conduct the continuous polymerizations in both of the first and the second reactors, a high quality polymer composition can be produced. According to the one-stage polymerization operation to conduct the continuous polymerization only in the first reactor, a lower quality polymer composition can be produced. The switching operation is not contemplated in any of Patent Documents 1 to 3. To switch the operation from the two-stage polymerization operation to the one-stage polymerization operation using the continuous polymerization apparatus disclosed in any of Patent Documents 1 to 3, it can be considered that the supply of the raw material monomer, or the like, to the second reactor is discontinued. During the discontinuation of the supply of the raw material monomer, or the like, to the second reactor, the raw material monomer, however, stays in a supply line (a replenishing line) for the raw material monomer, or the like, to the second reactor, and polymerizes at that point causing occlusion of the supply line, and, when switching of the operation is attempted again to the two-stage polymerization operation, the raw material monomer, or the like, cannot be supplied to the second reactor due to the occlusion of the supply line. It can be also considered that a polymerization inhibitor in addition to the raw material monomer is supplied to the second reactor without discontinuing the supply of the raw material monomer, or the like, to the second reactor in order to switch the operation from the two-stage polymerization operation to the one-stage polymerization operation. In this case, however, problems may arise that a large amount of polymerization inhibitor is added to the composition (the intermediate composition) supplied from the first reactor to the second reactor and the resin composition is colored that is finally obtained from the polymer composition taken out from the second reactor.

The inventors independently and actively studied a novel continuous polymerization apparatus that is an apparatus suitable for producing polymer compositions with different levels of quality using the switching operation, and completed the present invention.

The present invention provides items [1] to [28] as below.

[1] A continuous polymerization apparatus comprising at least a first reactor and a second reactor, wherein
each of the reactors comprises a supply port and an effluent port, wherein
the supply port of the first reactor is connected to supply sources of a raw material monomer and a polymerization initiator, wherein
the effluent port of the first reactor is connected to the supply port of the second reactor by a connection line, wherein
the connection line is combined with a replenishing line through an injection valve at a combining part located between the effluent port of the first reactor and the supply port of the second reactor, and wherein
the injection valve in a full closure state thereof comprises a clearance (gap) capable of causing a fluid comprising at least the raw material monomer to flow from the replenishing line to the connection line.

[2] The continuous polymerization apparatus of item [1], wherein
the injection valve comprises a plug, a body comprising a space that accommodates the plug, and a shaft that supports and operates the plug in the space, and wherein
in the full closure state, the clearance is formed between an inner wall face of the body and a surface of the plug.

[3] The continuous polymerization apparatus of item [1] or [2], wherein an inner volume of the body of the injection valve in the full closure state thereof is 1 to 30% of an inner volume of the body in a full open state of the injection valve.

[4] The continuous polymerization apparatus of any one of items [1] to [3], wherein the replenishing line is connected to a supply source of a raw material monomer and a polymerization initiator and a supply source of a raw material monomer and a polymerization inhibitor, switchably therebetween.

[5] The continuous polymerization apparatus of any one of items [1] to [4], wherein each of the first reactor and the second reactor is a tank-type reactor, and wherein the effluent port of each of the reactors is located at a top of the reactor.

[6] The continuous polymerization apparatus of any one of items [1] to [5], wherein each of the first reactor and the second reactor is a complete mixing-type reactor.

[7] The continuous polymerization apparatus of any one of items [1] to [6], wherein each of the first reactor and the second reactor further comprises a temperature detecting means that detects a temperature in the reactor.

[8] The continuous polymerization apparatus of any one of items [1] to [7], wherein the connection line comprises a cooling means.

[9] The continuous polymerization apparatus of any one of items [1] to [8], wherein the connection line comprises a mixing means.

[10] The continuous polymerization apparatus of any one of items [1] to [9], wherein another supply port provided on the second reactor is connected to a supply source of a new polymerization initiator.

[11] The continuous polymerization apparatus of any one of items [1] to [10], wherein the first reactor and the second reactor are used to conduct a continuous bulk polymerization, respectively.

[12] A production method of a polymer composition using the continuous polymerization apparatus of any one of items [1] to [11], the production method comprising:
a first polymerization step of continuously supplying the raw material monomer and the polymerization initiator from the supply sources of the raw material monomer and the polymerization initiator, to the first reactor, through the supply port of the first reactor to subject the raw material monomer and the polymerization initiator to a continuous polymerization in the first reactor, and continuously taking out an intermediate composition obtained thereby from an effluent port of the first reactor,
a raw material monomer supply step of supplying a fluid comprising at least a raw material monomer from the replenishing line to the intermediate composition through the injection valve in the course of transfer of the intermediate composition from the effluent port of the first reactor to the supply port of the second reactor through the connection line, and
a second polymerization step of continuously supplying a mixture of the intermediate composition taken out from the effluent port of the first reactor and the fluid supplied from the replenishing line through the injection valve, to the second reactor, through the supply port of the second reactor to further subject the mixture to a continuous polymerization in the second reactor, and continuously taking out a polymer composition obtained thereby from an effluent port of the second reactor.

[13] The production method of a polymer composition of item [12], wherein the fluid comprising at least the raw material monomer further comprises a polymerization initiator.

[14] The production method of a polymer composition of item [12] or [13], further comprising an intermediate cooling step of continuously cooling at least the intermediate composition using a cooling means of the connection line in a course of transfer of the intermediate composition from the effluent port of the first reactor to the supply port of the second reactor through the connection line.

[15] The production method of a polymer composition of any one of items [12] to [14], wherein the temperature of the mixture at the supply port of the second reactor is lower by 5 to 80° C. than a temperature of the intermediate composition at the effluent port of the first reactor.

[16] A production method of a polymer composition using the continuous polymerization apparatus of any one of items [1] to [11], the production method comprising a polymerization step of continuously supplying the raw material monomer and the polymerization initiator from the supply sources of the raw material monomer and the polymerization initiator, to the first reactor, through a supply port of the first reactor to subject the raw material monomer and the polymerization initiator to a continuous polymerization in the first reactor, and continuously taking out an intermediate composition obtained thereby from the effluent port of the first reactor, a raw material monomer supply step of supplying a fluid comprising at least a raw material monomer from the replenishing line to the intermediate composition through the injection valve in a course of transfer of the intermediate composition from the effluent port of the first reactor to the supply port of the second reactor through the connection line, and a passage step of continuously supplying a mixture of the intermediate composition taken out from the effluent port of the first reactor and the fluid supplied from the replenishing line through the injection valve, to the second reactor, through a supply port of the second reactor for the mixture to pass through the second reactor, and continuously taking out the mixture as a polymer composition from an effluent port of the second reactor.

[17] The production method of a polymer composition of item [16], wherein, at the raw material monomer supply step, the injection valve is used in the full closure state thereof.

[18] The production method of a polymer composition of item [16] or [17], wherein the fluid comprising at least the raw material monomer further comprises a polymerization inhibitor.

[19] The production method of a polymer composition of any one of items [12] to [18], wherein a temperature in the first reactor detected by a temperature detecting means of the first reactor and a temperature in the second reactor detected by a temperature detecting means of the second reactor are within a range from 120 to 180° C., respectively.

[20] A molded article obtained from the polymer composition obtained by using of the production method of any one of items [12] to [19].

[21] An injection valve comprising a plug, a body comprising a space to accommodate the plug, and a shaft that supports and operates the plug in the space, wherein a clearance is formed between an inner wall face of the body and a surface of the plug in a full closure state of the injection valve.

[22] The injection valve of item [21], wherein the injection valve is used in a reactor used to conduct a polymerization.

[23] The injection valve of item [22], wherein the polymerization is a continuous polymerization.

[24] The injection valve of any one of items [21] to [23], wherein the injection valve is used to supply a fluid comprising at least a raw material monomer to the reactor used to conduct the polymerization.

[25] The injection valve of item [24], wherein the fluid comprising at least the raw material monomer further comprises a polymerization initiator.

[26] The injection valve of item [24], wherein the fluid comprising at least the raw material monomer further comprises a polymerization inhibitor.

[27] A polymerization apparatus comprising the injection valve of any one of items [21] to [26].

[28] A production method of a polymer composition conducted by using of the polymerization apparatus of item [27].

Effects of the Invention

According to the present invention, a novel continuous polymerization apparatus is provided. More specifically, the continuous polymerization apparatus according to the present invention is suitable for operating this apparatus switching between a two-stage polymerization operation and a one-stage polymerization operation, and thereby, polymer compositions having different levels of quality can be produced effectively preventing any occlusion of the replenishing line and any coloring of resin compositions obtained from the polymer compositions. According to the present invention, a production method of a polymer composition can be also provided that can be conducted using the continuous polymerization apparatus, and that can produce polymer compositions having different levels of quality. Furthermore, according to the present invention, an injection valve is also provided, that is usable for the continuous polymerization apparatus (but whose use is not limited to the above).

DESCRIPTION OF EMBODIMENTS

Figure 1:
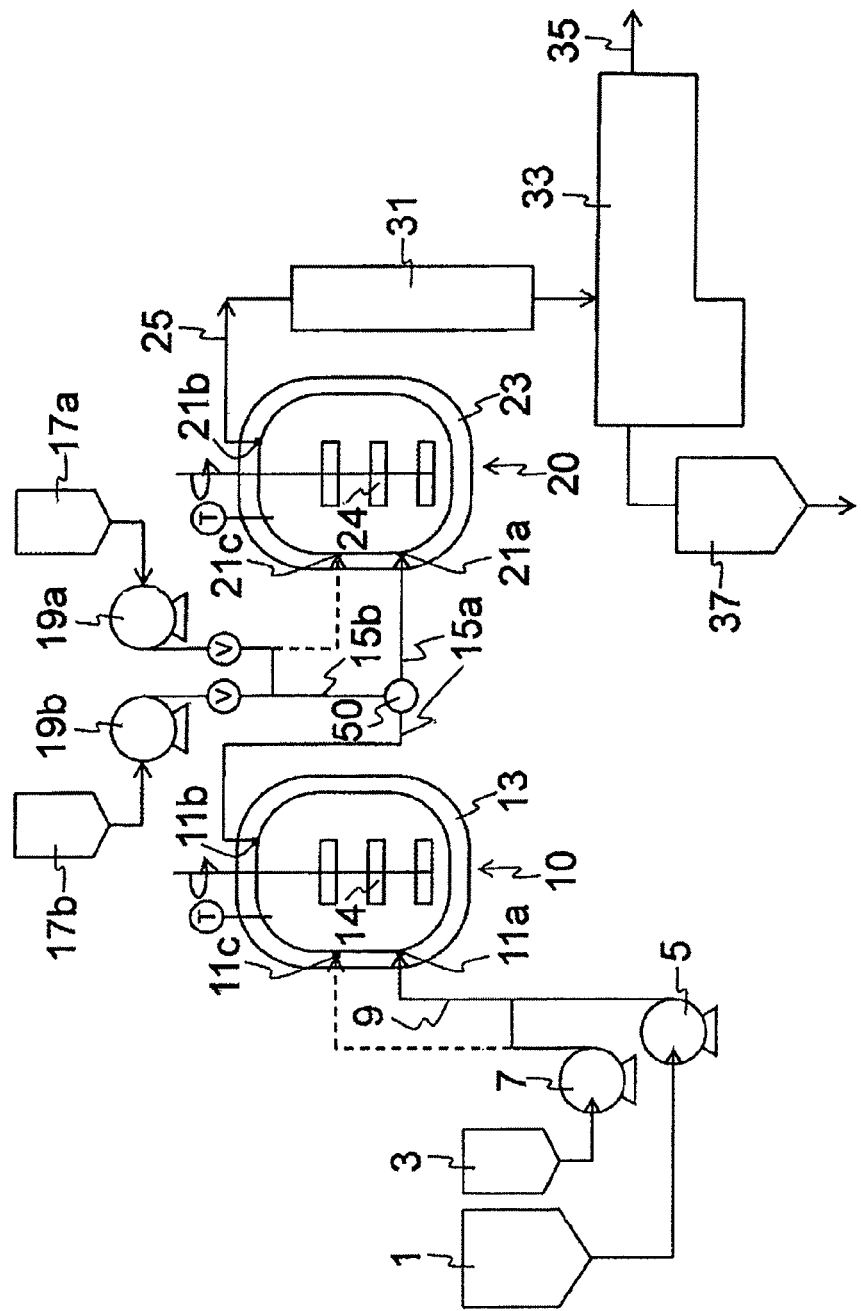
FIG. 1 is a schematic view illustrating a continuous polymerization apparatus in one embodiment according to the present invention.

A continuous polymerization apparatus according to the present invention includes at least two reactors, and a continuous polymerization, for example, either a continuous bulk polymerization or a continuous solution polymerization may be conducted in each of the reactors. The continuous polymerization apparatus according to the present invention is understood as a continuous bulk polymerization apparatus when a continuous bulk polymerization is conducted in all the reactors, and is understood as a continuous solution polymerization apparatus when a continuous solution polymerization is conducted in all the reactors. The continuous polymerization apparatus according to the present invention is, however, not limited to the above, and may be the one whose one reactor (for example, at least one pre-stage reactor) is used to conduct a continuous bulk polymerization and whose another one reactor (for example, at least one further post-stage reactor) is used to conduct a continuous solution polymerization.

One embodiment according to the present invention will be described in detail below with reference to FIGS. 1 to 4.

The continuous polymerization apparatus of this embodiment includes, at least, a first reactor 10 and a second reactor 20. These reactors 10 and 20 are not especially limited only when the reactors 10 and 20 are each usable to conduct a continuous polymerization such as a continuous bulk polymerization and a continuous solution polymerization, and, preferably, are used to conduct a continuous bulk polymerization. The reactors 10 and 20 may each be, for example, a tank-type reactor or a pipe-type reactor, are each, preferably, a (continuous) tank-type reactor. Preferably, the reactors 10 and 20 are each a complete mixing-type reactor. More preferably, the reactors 10 and 20 are each a complete mixing-type (continuous) tank-type reactor, and, yet more preferably, are each used to conduct a continuous bulk polymerization. Hereinafter, though the case will be described where the complete mixing-type (continuous) tank-type reactors are used as the reactors 10 and 20 in the embodiment according to the present invention, the reactors used in the present invention are not limited to the above.

More specifically, the first reactor 10 includes a supply port 11a and an effluent port 11b, and, preferably, further includes a jacket 13 as a temperature regulating means to regulate the temperature of an outer wall face of the reactor, and a stirrer 14 to stir the content thereof. Similarly, the second reactor 20 includes a supply port 21a and an effluent port 21b, and, preferably, further includes a jacket 23 surrounding the outer wall face of the reactor as a temperature regulating means to regulate the temperature of the outer wall face of the reactor, and a stirrer 24 to stir the content thereof. Though the effluent ports 11b and 21b are each provided to be located at a top of the reactor in this embodiment, the locations are not limited thereto.

On the other hand, though the supply ports 11a and 21a do not limit this embodiment, the supply ports 11a and 21a may each generally be provided at a proper position beneath the reactor. The reactors 10 and 20 may each further include a temperature sensor T as a temperature detecting means to detect the temperature in the reactor.

The first reactor 10 and the second reactor 20 may each have an inner volume equal to or different from that of each other. The average residence time can effectively be caused to differ between the first reactor 10 and the second reactor 20 by causing the inner volume of the first reactor 10 and the inner volume of the second reactor 20 to differ from each other.

The stirrers 14 and 24 are each used to establish a substantially complete mixed state in the reactor. These stirrers may each include an arbitrary proper stirring blade(s) and may each include, for example, blades of MIG impellers, MAX-BLEND impellers (registered trademark, manufactured by Sumitomo Heavy Industries, Ltd.), paddle impellers, double helical ribbon impellers, FULLZONE impellers (registered trademark, manufactured by Kobelco Eco-Solutions Co., Ltd.), etc. To enhance the stirring effect in the reactor, desirably, the reactor has a baffle(s) attached therein. This embodiment is, however, not limited thereto, and, preferably, may have an arbitrary proper configuration instead of each of the stirrers 14 and 24 as long as the substantially complete mixed state can be established in each of the reactors.

Though it is generally more advantageous for the reactors 10 and 20 to each have higher stirring efficiency, it is advantageous that the power of stirring is not higher than necessary from the viewpoint that no extra amount of heat is added to the content of the reactor by the stirring operation. Though the power of stirring is not especially limited, the power is, preferably, 0.5 to 30 kW/m$^3$, and is, more preferably, 0.5 to 20 kW/m$^3$, and is, yet more preferably, 1 to 15 kW/m$^3$. Preferably, the power of stirring is set to be higher as the viscosity of the reaction system is higher (or as the content proportion of the polymer in the reaction system is higher).

As depicted, the supply port 11a of the first reactor 10 is connected through a raw material supply line 9 to a raw material monomer tank (a supply source of a raw material monomer) 1 and a polymerization initiator tank (a supply source of a polymerization initiator, and, when necessary, the raw material monomer) 3 respectively through pumps 5 and 7. In this embodiment, the supply sources of the raw material monomer and the polymerization initiator are respectively the raw material monomer tank 1 and the polymerization initiator tank 3, while the number of the supply sources of the raw material monomer and the polymerization initiator, the forms of the raw material monomer and the polymerization initiator (for example, in the case of a mixture, a composition thereof), and the like, are not especially limited as long as the raw material monomer and the polymerization initiator can properly be supplied to the first reactor 10. Though not essential to this embodiment, another supply port 11c may be provided on the first reactor 10, and this supply port 11c may be connected to the polymerization initiator tank 3 through the pump 7 as indicated by, for example, a dotted line in FIG. 1. The effluent port 11b of the first reactor 10 is connected to the supply port 21a of the second reactor 20 through a connection line 15a. The effluent port 21b of the second reactor 20 is connected to an effluent line 25. The first reactor 10 and the second reactor 20 are, thereby, connected in series. Preferably, no pump is present in the connection line 15a between the effluent port 11b of the first reactor 10 and the supply port 21a of the second reactor 20.

The connection line 15a is combined with a replenishing line 15b through an injection valve 50 at a combining part located between the effluent port 11b of the first reactor 10 and the supply port 21a of the second reactor 20. In this embodiment, the replenishing line 15b is connected to a two-stage polymerization raw material monomer tank (a supply source of a new (additional) raw material monomer and a new (additional) polymerization initiator) 17a through a pump 19a, and is connected to a one-stage polymerization raw material monomer tank (a supply source of a new (additional) raw material monomer and a new (additional) polymerization inhibitor) 17b through a pump 19b. A valve V inserted on the side closer to the pump than the replenishing line 15b can control whether a fluid containing at least the raw material monomer is supplied to the replenishing line 15b from the two-stage polymerization raw material monomer tank 17a or the one-stage polymerization raw material monomer tank 17b. The replenishing line 15b is, thereby, connected to the supply source of the raw material monomer and the polymerization initiator, and the supply source of the raw material monomer and the polymerization inhibitor switchably therebetween. In this embodiment, the two-stage polymerization raw material monomer tank 17a includes the polymerization initiator in addition to the raw material monomer, and may, therefore, be understood as a supply source of a new polymerization initiator, while the number of the supply sources of the new polymerization initiator, the form of the polymerization initiator (for example, in the case of a mixture, a composition thereof), and the like, are not especially limited as long as the new polymerization initiator can properly be supplied to the second reactor 20. As depicted by a solid line in FIG. 1, the supply port 21a of the second reactor 20 may be connected to the two-stage polymerization raw material monomer tank 17a through the pump 19a by the injection valve 50 through the connection line 15a. Moreover, another supply port 21c may be provided on the second reactor 20, and, as indicated by, for example, a dotted line in FIG. 1, this supply port 21c may be connected to the polymerization initiator tank 17a through the pump 19a. The present invention is, however, not limited to this embodiment, and the fluid containing at least the raw material monomer only has to be able to be supplied from the replenishing line 15b to the connection line 15a by the injection valve 50. For example, instead of the two-stage polymerization raw material monomer tank 17a and the one-stage polymerization raw material monomer tank 17b, and the pumps 19a and 19b associated therewith, a (common) raw material monomer tank including the raw material monomer and none of the polymerization initiator and the polymerization inhibitor, and a pump associated therewith may be used.

Figure 2:
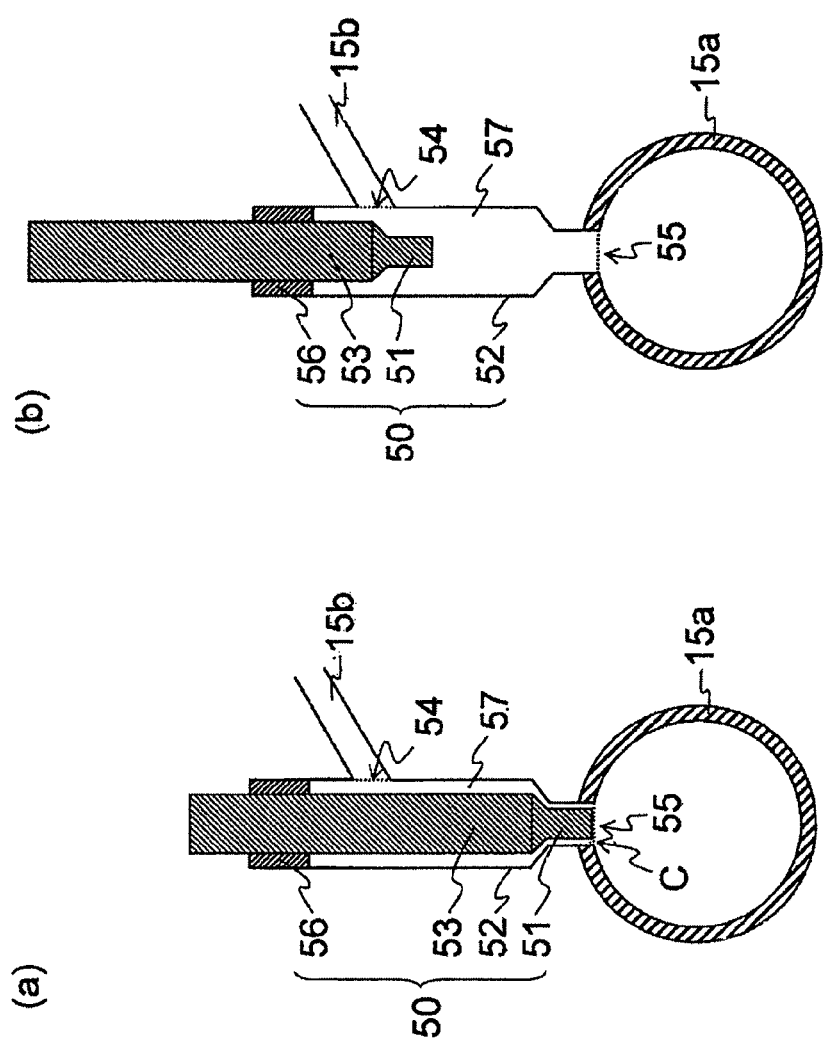
FIG. 2 is schematic cross-sectional view illustrating an injection valve and the vicinity thereof in the continuous polymerization apparatus in one embodiment according to the present invention, and FIG. 2 (a) illustrates the state where the injection valve is in its full closure state, and FIG. 2 (b) illustrates the state where the injection valve is in its full open state.
Figure 3:
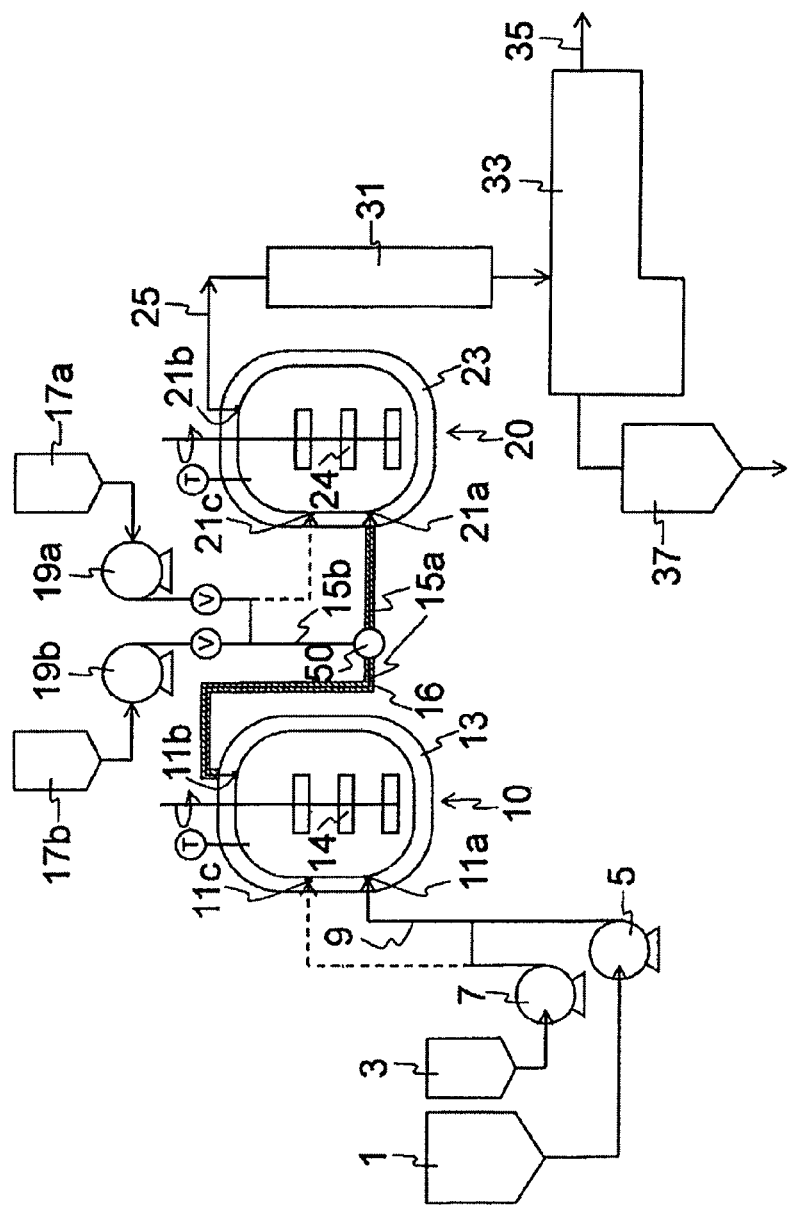
FIG. 3 is a schematic view illustrating an example of the continuous polymerization apparatus having a jacket provided on a connection line in the embodiment shown in FIG. 1.

As illustrated in FIGS. 2 (a) and (b), the injection valve 50 includes a plug 51, a body 52 including a space to accommodate the plug 51, and a shaft 53 that supports and operates the plug 51 in the space. The shaft 53 is connected to a driving unit (not depicted), and is configured to be able to operate the plug 51 (upward and downward motions in the depicted aspect) supporting the plug 51 in the body 52. The body 52 has an introduction port 54 and a discharge port 55 formed thereon. The introduction port 54 communicates with the replenishing line 15b, and is configured to be able to introduce the fluid containing at least the raw material monomer from the replenishing line 15b into the body 52. On the other hand, the discharge port 55 communicates with the connection line 15a, and is configured to be able to supply the fluid containing at least the raw material monomer introduced into the body 52, to the connection line 15a. The body 52 includes, for example, a tapered part as illustrated, and the plug 51 can be fitted with the body 52 in the vicinity of the discharge port 55 of the body 52 (securing a clearance (gap) C as described later) by operating the plug 51 through the shaft 53. A seal part 56 may seal a space between the body 52 and the shaft 53. As illustrated in FIG. 2 (a), it is assumed that the injection valve 50 is in its full closure state when the tip of the plug 51 and an inner wall face of the connection line 15a are aligned substantially in one plane. As illustrated in FIG. 2 (b), it is assumed that the injection valve 50 is in its full open state when the tip of the plug 51 is at an utmost distance from the discharge port 55. In the full closure state illustrated in FIG. 2 (a), the injection valve 50 has a clearance C between the inner wall face of the body 52 and the surface of the plug 51, and it is configured such that the fluid containing at least the raw material monomer can flow from the replenishing line 15b to the connection line 15a through the clearance C. The inner volume of the body 52, in other words, the volume of the inner space 57 that may be filled with the fluid of the body 52 varies between the full closure state illustrated in FIG. 2 (a) and the full open state illustrated in FIG. 2 (b). The inner volume of the body 52 in the full closure state thereof may be, for example, 1 to 30%, and is, preferably, 1 to 20% of the inner volume of the body 52 in the full open state thereof. The fluid containing at least the raw material monomer can be prevented from staying (especially, when this fluid includes the polymerization initiator) to occlude the clearance C by setting the inner volume of the body 52 in the full closure state to be equal to or larger than 1% of the inner volume in the full open state thereof, and the resin composition finally obtained can effectively prevented from being colored (even when the fluid includes the polymerization inhibitor) by setting the inner volume to be equal to or smaller than 30% of the inner volume in the full open state thereof.

Though the pumps 5, 7, 19a and 19b are each not especially limited, preferably, these pumps are pumps respectively capable of setting the flow rates from the tanks 1, 3, 17a and 17b, respectively, to be a constant amount. Preferably, for example, these pumps can each be a multiple reciprocating pump, and can each be, more preferably, a pulsation-free controlled-volume pump such as a duplicate pulsation-free controlled-volume pump and a triplex pulsation-free controlled-volume pump. Such supply amounts can, thereby, be controlled as the supply amount (or the supply flow rate, and this will also apply hereinafter) of each of the raw material monomer and the polymerization initiator to the first reactor 10 as well as an additional supply amount of the fluid containing at least the raw material monomer (in this embodiment, a mixture of the raw material monomer and the polymerization initiator, or a mixture of the raw material monomer and the polymerization inhibitor) to the second reactor 20.

Figure 4:
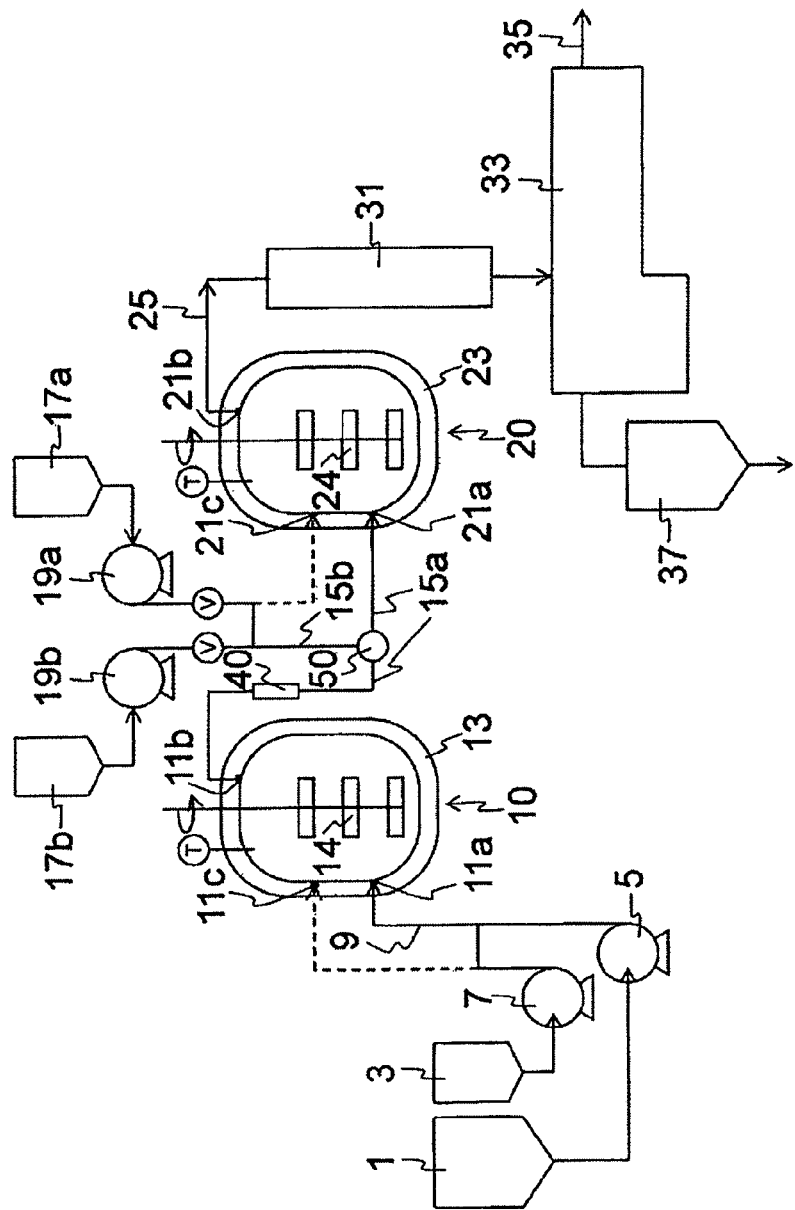
FIG. 4 is a schematic view illustrating an example of the continuous polymerization apparatus having a cooler provided on the connection line in the embodiment shown in FIG. 1.

The connection line 15a connecting the effluent port 11b of the first reactor 10 to the supply port 21a of the second reactor 20 may include a jacket 16 (indicated by hatching in FIG. 3) surrounding a part or all of the outer wall face of the connection line 15a, a cooler 40 replacing a part of the connection line 15a as depicted in FIG. 4, or a trace pipe through which a cooling medium passes, and the like, as a cooling means capable of at least partially cooling the connection line 15a (the connection line equipped with the jacket is understood as a double pipe). Thereby, the temperature of the connection line 15a (more specifically, the temperature in the connection line) can further be decreased corresponding to the temperature of the first reactor 10 and/or the second reactor 20, etc. Because the first reactor 10 includes the temperature sensor T as the temperature detecting means to detect the temperature in the first reactor 10 as described above, the jacket 16 or the cooler 40 (the cooling means) of the connection line 15a may be controlled such that the temperature in the connection line 15a in the vicinity of the supply port 21a of the second reactor 20 is lower than the temperature in the first reactor 10 that is detected by the temperature sensor T. In FIG. 4, the cooler 40 is provided in an arbitrary proper form on the connection line 15a, and the heat in the line part other than the cooler 40 of the connection line 15a may be retained by covering the line part with a lagging material (not depicted), or the line part may be cooled by concurrently using a jacket (not depicted in FIG. 4) surrounding the outer wall face of the connection line 15a. This cooling is advantageously conducted in the two-stage polymerization operation, and may be conducted in the one-stage polymerization operation.

Though not essential to the present invention, preferably, the connection line 15a includes a mixing means based on the point that the evenness of the temperature distribution in the connection line 15a can be improved and any occlusion of the connection line 15a caused by the intermediate composition (described later) flowing through the connection line 15a can be suppressed. Preferably, the mixing means is provided in the cooling part of the connection line 15a, based on the point that the cooling efficiency is improved. The mixing means can be, for example, a static mixer, a dynamic mixer, and the like, among these, preferably, the static mixer is used. The static mixer is a mixer that needs no driving unit, and is provided in the connection line 15a in an arbitrary proper form. For example, in FIGS. 1 and 2, the static mixer may be inserted into the connection line 15a at a proper position in the inside thereof, or a part or all of the connection line 15a may be replaced with the static mixer forming the line. In FIG. 4, the static mixer may be inserted into the connection line 15a at a proper position in the inside of the line part other than the cooler 40 thereof, or a part or all of the line part other than the cooler 40 of the connection line 15a may be replaced with the static mixer forming the line. The static mixer can be, for example, a "Sulzer mixer" manufactured by Sulzer Chemtech Ltd, and the like, for example, Sulzer mixers of an SMX type, an SMI type, an SMV type, an SMF type, an SMXL type, and the like are usable.

In the embodiment of FIG. 4, a cooler 40 formed by combining a cooling means and a mixing means may be provided as the cooler 40. The cooler 40 formed by combining a cooling means and a mixing means can be a cooler having a dynamic mixing function and a cooler having a static mixing function. The cooler having the dynamic mixing function can be, for example, a screw mixer capable of cooling a cylinder, etc. The cooler having the static mixing function can be, for example, a heat exchanger with a built-in static mixer, etc. Preferably, the SMR-type Sulzer mixer manufactured by Sulzer Chemtech Ltd., is used, as the heat exchanger with a built-in static mixer, based on the point that a heat-transfer area is large and a high cooling capacity can therefore be obtained. When the heat exchanger with a built-in static mixer is used as the cooler 40, a part or all of the connection line 15a may be replaced with the heat exchanger with a built-in static mixer forming the line.

Preferably, the members described above with reference to FIG. 1 are properly connected to a control means (not depicted) described later, and are holistically configured for the operations thereof to be controllable by the control means. Thereby, to cause the temperatures of the outer wall faces of the reactors set for the jackets (temperature regulating means) 13 and 23 and the temperatures in the reactors detected by the temperature sensors (the temperature detecting means) T to be equal for each of the first reactor 10 and the second reactor 20 (in other words, to realize an adiabatic condition in each of the first reactor 10 and the second reactor 20), the supply amounts of the raw material monomer and the polymerization initiator to the first reactor 10 can be adjusted by operating the pumps 5 and 7, or the temperatures of the outer wall faces of the reactors set for the jackets 13 and 23 can be regulated. Furthermore, the additional supply amount of the fluid containing at least the raw material monomer (in this embodiment, the mixture of the raw material monomer and the polymerization initiator, or the mixture of the raw material monomer and the polymerization inhibitor) to the second reactor 20 can be adjusted by operating the pumps 19a and 19b. When the apparatus is operated in the two-stage polymerization operation, to avoid any excessively high polymerization temperature in the second reactor 20 achieving a desired polymerization conversion in the second reactor 20, preferably, the temperature in the connection line 15a in the vicinity of the supply port 21a of the second reactor 20 can be caused to be lower than the temperature in the first reactor 10 detected by the temperature sensor (the temperature detecting means) T by adjusting the temperature of the outer wall face of the connection line 15a set for the jacket (the cooling means) 16 covering the connection line 15a. In FIG. 4, the temperature in the connection line 15a in the vicinity of the supply port 21a of the second reactor 20 can be caused to be lower than the temperature in the first reactor 10 detected by the temperature sensor (the temperature detecting means) T by adjusting the set temperature of the cooler 40 replacing the part of the connection line 15a. Preferably, the temperature in the connection line 15a is actually measured at a point in the vicinity of the supply port 21a of the second reactor 20, and, when necessary, at another point, by a temperature detecting means to detect the temperature in the connection line 15a. Depending on the polymerization reaction conditions in the first reactor 10, however, due to the factors such as complete consumption of the supplied polymerization initiator, the polymerization reaction of the intermediate composition (described later) taken out from the effluent port 11b does not take place in the connection line 15a, that is, no heat of the polymerization reaction may be generated in the connection line 15a. In this case, the temperature in the connection line 15a in the vicinity of the effluent port 11b of the first reactor 10 may be considered to be substantially equal to the temperature in the first reactor 10 detected by the temperature sensor (the temperature detecting means) T. In this case, it is considered that, preferably, the temperature in the connection line 15a in the vicinity of the supply port 21a of the second reactor 20 becomes lower than the temperature in the first reactor 10 by setting the temperature of the jacket 16 covering the connection line 15a or the temperature of the cooler 40 replacing the part of the connection line 15a to be lower than the temperature in the first reactor 10. In FIG. 4, when a jacket is provided on the line part other than the cooler 40 of the connection line 15a, which surrounds the circumference thereof, the temperature in the connection line 15a may be adjusted by concurrently using the jacket.

The jackets 13 and 23 respectively cover the substantially all of the reactors 10 and 20 to properly heat or properly retain the heat of the reactors 10 and 20 by introducing a heat medium such as steam, hot water, or an organic heat medium from a heat medium supply route (not depicted). The temperatures of the jackets 13 and 23 can properly be regulated by using of the temperature or the pressure of the heat medium to be supplied.

The heat medium introduced into the jackets 13 and 23 is removed through a heat medium discharge route (not depicted). The temperatures and the pressures of the jackets 13 and 23 are detected by sensors such as a temperature sensor(s) (not depicted) provided in the heat medium discharge route. The point(s) for the sensor such as a temperature sensor(s) to be provided at is not especially limited, and the sensor(s) may be provided, for example, in the heat medium supply route and in the jackets 13 and 23. The jacket 16 that may be provided on the connection line 15a as a cooling means may each have the same or similar configuration as those of the jackets 13 and 23. Though not limiting this embodiment, the connection line 15a may, typically, be a double pipe, and the internal space of the inner pipe thereof is a flow path of the intermediate composition (described later), and the space between the inner pipe and the outer pipe is a flow path of the heat medium (the jacket 16).

For the polymerization reactions in the reactors 10 and 20 (as to the polymerization reaction in the reactor 20, the case where the apparatus is operated in the two-stage polymerization operation, this will similarly apply hereinafter), it is required to conduct the polymerization reactions in the reactors 10 and 20 each at a substantially constant polymerization temperature from the viewpoint that the quality of the produced polymer is set to be constant. The above-described temperature regulating means (the jackets 13 and 23) are, therefore, each controlled to at a constant temperature set in advance for the internal temperature of each of the reactors 10 and 20 to be able to be maintained at a substantially constant temperature.

The set temperatures of the above-described temperature regulating means (the jackets 13 and 23) are transmitted to the control means described later, to be used as data to determine whether any control is necessary for the supply flow rates by the monomer supply means (the pumps 5, 19a, and 19b), the initiator supply means (the pumps 7 and 19a), and the inhibitor supply means (the pump 19b). Herein, the set temperatures of the above-described temperature regulating means (the jackets 13 and 23) can be regulated by controlling the temperature or the pressure of the heat medium.

The control means can be, for example, a control unit (not depicted) including a CPU, a ROM, a RAM, etc.

The ROM of the control unit is a device to store a program(s) to control the pumps 5, 7, 19a, 19b, etc. The RAM of the control unit is a device that temporarily stores the data of the temperatures in the reactors 10 and 20 detected by the temperature sensors T, data of the set temperatures of the jackets 13 and 23, and data of the set temperature of the jacket 16 or the cooler 40 of the connection line 15a when the jacket 16 or the cooler 40 is present, to execute the above-described program(s).

The CPU of the control unit executes the program(s) stored in the above-described ROM based on the data of the temperatures in the reactors 10 and 20 and the data of the set temperatures of the jackets 13 and 23 stored in the above-described RAM, to cause the monomer supply means (the pumps 5, 19a, and 19b), the initiator supply means (the pumps 7 and 19a) and/or the inhibitor supply means (the pump 19b) to control the supply flow rates of the raw material monomer, and the polymerization initiator and/or the polymerization inhibitor to the reactors 10 and 20, respectively. Herein, as to the jacket 16 or the cooler 40 that may be provided on the connection line 15a as the cooling means, the CPU of the control unit may adjust the set temperature of the jacket 16 or the cooler 40 of the connection line 15a by executing the program(s) stored in the above-described ROM (or programs that may be a part of the program(s), or may be program(s) other than the above program(s)) based on the data of the temperatures in the reactors 10 and 20, and the data of the set temperature of the jackets 16 or the cooler 40 of the connection line 15a, and the temperature in the connection line 15a at the point in the vicinity of the supply port 21a of the second reactor 20 or another point when actual measurement is conducted, that are stored in the above-described RAM.

An example of the control conducted by the control means (the control unit) will be described below.

In the two-stage polymerization operation, the valve V is closed between the replenishing line 15b and the pump 19b and the valve V is opened between the replenishing line 15b and the pump 19a to control the injection valve 50 to be in the full open state. In the one-stage polymerization operation, the valve V is closed between the replenishing line 15b and the pump 19a and the valve V is opened between the replenishing line 15b and the pump 19b to control the injection valve 50 to be in the full open state.

In the two-stage polymerization operation and the one-stage polymerization operation, when the temperature in the reactor 10 detected by the temperature sensor T exceeds the set temperature of the jacket 13 that is the temperature regulating means, the CPU executes the program(s) in the ROM to thereby control the pump 7 to, for example, decrease the supply flow rate of the polymerization initiator to the reactor 10. In the two-stage polymerization operation, during the supply of the raw material monomer and the polymerization initiator, by the pump 19a, to the reactor 20 to conduct the polymerization, when the temperature in the reactor 20 detected by the temperature sensor T exceeds the set temperature of the jacket 23 that is the temperature regulating means, the CPU executes the program(s) in the ROM to thereby control the pump 19a to, for example, decrease the supply flow rates of the raw material monomer and the polymerization initiator to the reactor 20. The polymerization heat generated in the reactor(s) 10 and/or 20 can thereby be decreased, and, as a result, the temperature in the reactor(s) 10 and/or 20 can be decreased by conducting the above-described control.

On the other hand, in the two-stage polymerization operation and the one-stage polymerization operation, when the temperature in the reactor 10 is lower than the set temperature of the jacket 13, the CPU executes the program(s) in the ROM to thereby control the pump 7 to, for example, increase the supply flow rate of the polymerization initiator to the reactor 10. In the two-stage polymerization operation, during the supply of the raw material monomer and the polymerization initiator by the pump 19a to the reactor 20 to conduct the polymerization, when the temperature in the reactor 20 is lower than the set temperature of the jacket 23, the CPU executes the program(s) in the ROM to thereby control the pump 19a to, for example, increase the supply flow rates of the raw material monomer and the polymerization initiator to the reactor 20. The polymerization heat generated in the reactor(s) 10 and/or 20 can thereby be increased, and, as a result, the temperature in the reactor(s) 10 and/or 20 can be increased by conducting the above-described control.

For example, in the two-stage polymerization operation, as to the polymerization reactions in the reactors 10 and 20, when the total supply flow rate to the reactors 10 and 20 is significantly decreased as results of the controls on the pump 7 and the pump 19a, preferably, not only the supply flow rate of the polymerization initiator is decreased by controlling the pump 7 and the pump 19a, but also, concurrently, the supply flow rate of the raw material monomer is increased by controlling the pump 5.

Another exemplary control can be the following controls. Thus, in the two-stage polymerization operation and the one-stage polymerization operation, when the temperature in the reactor 10 detected by the temperature sensor T exceeds the set temperature of the jacket 13 that is the temperature regulating means, the pump 5 is controlled to increase the supply flow rate of the raw material monomer, and the relative supply flow rate of the polymerization initiator into the reactor 10 is thereby decreased. This control can also decrease the temperature in the reactor 10.

A ratio of the supply flow rate of the raw material monomer to the supply flow rate of the polymerization initiator may properly be set corresponding to the type of the polymer to be produced, the type of the polymerization initiator to be used, etc.

The degree of the increase or the decrease of each of the supply flow rate of the raw material monomer and the supply flow rate of the polymerization initiator is also properly set corresponding to the type of the polymer to be produced, the type of the polymerization initiator to be used, etc. It is, however, necessary to control the supply flow rate of the polymerization initiator taking into consideration the content proportion of the polymerization initiator in the raw material monomer that contains the polymerization initiator when the material supplied to the reactors 10 and 20 by the initiator supply means is not the polymerization initiator alone but is the raw material monomer containing the polymerization initiator.

Moreover, another exemplary control can be the following control for the jacket 16 or the cooler 40 that may be provided on the connection line 15a as a cooling means. In the two-stage polymerization operation, when the temperature in the connection line 15a in the vicinity of the supply port 21a of the second reactor 20 is equal to or higher than the temperature in the first reactor 10 detected by the temperature sensor T, the CPU executes the program(s) in the ROM to thereby control the device(s) (not depicted) associated with the jacket 16 or the cooler 40 of the connection line 15a to regulate the set temperature of the jacket 16 or the cooler 40 to be a lower temperature such that the temperature in the connection line 15a in the vicinity of the supply port 21a of the second reactor 20 is lower, preferably, by 5 to 80° C. than the temperature in the first reactor 10. Though the set temperature of the jacket 16 of the connection line 15a is not especially limited, this set temperature can generally be regulated by controlling the flow amount and/or the temperature of the heat medium flowing through the jacket 16. Though the set temperature of the cooler 40 of the connection line 15a is not especially limited, when a heat exchanger with a built-in static mixer is used as the cooler 40, this set temperature can generally be regulated by controlling the flow amount and/or the temperature of the heat medium flowing through the heat exchanger with a built-in static mixer.

The following control may be conducted as an exemplary advantageous control. In the two-stage polymerization operation, when the temperature in the second reactor 20 detected by the temperature sensor T of the second reactor 20 is equal to or higher than the temperature in the first reactor 10 detected by the temperature sensor T of the first reactor 10, the CPU may execute the program(s) in the ROM to thereby control as described above to properly regulate the set temperature of the jacket 16 or the cooler 40 (and, when the cooler 40 and the jacket are concurrently used, the jacket) of the connection line 15a such that the temperature in the connection line 15a in the vicinity of the supply port 21a of the second reactor 20 is lower than and, preferably, lower by 5 to 80° C. than the temperature in the first reactor 10, or to thereby control the pumps 5, 7 and 19a to adjust the supply flow rates to the reactor 10 and/or the reactor 20. The difference can, thereby, be decreased between the temperature in the first reactor 10 and the temperature in the second reactor 20. When any polymerization heat is generated in the second reactor 20, it is effective to regulate the set temperature of the jacket 16 or the cooler 40 (and, when the cooler 40 and the jacket are concurrently used, the jacket) of the connection line 15a.

Though not essential to this embodiment, a preheater 31 and a devolatilizing extruder 33 may be provided downstream the effluent line 25. A pressure adjusting valve (not depicted) may be provided between the preheater 31 and the devolatilizing extruder 33. An extruded object after a devolatilization is discharged from a discharge line 35.

An arbitrary proper heater may be used as the preheater 31 as long as the heater can heat a viscous fluid. A single or multi screw devolatilizing extruder may be used as the devolatilizing extruder 33.

Moreover, a recovery tank 37 may be present, that stores the raw material monomer separated and recovered from volatile components (including mainly the unreacted raw material monomer(s)) separated by the devolatilizing extruder 33.

Subsequently, a production method of a polymer composition conducted by using of the above-described apparatus will be described. The production method of the polymer composition of this embodiment is conducted switchably between the two-stage polymerization operation and the one-stage polymerization operation, by using of the above-described continuous polymerization apparatus. The case will be described in this embodiment, as an example, where a methacrylic ester monomer is continuously polymerized, in other words, where a methacrylic ester polymer is produced. The present invention is, however, not limited to this case.
Preparation Firstly, the raw material monomer, the polymerization initiator, the polymerization inhibitor, and the like, are prepared.

A methacrylic ester monomer is used in this embodiment as the raw material monomer.

The methacrylic ester monomer can be, for example,
alkyl methacrylate (whose alkyl group contains 1 to 4 carbons) alone, or
a mixture of alkyl methacrylate (whose alkyl group contains 1 to 4 carbons) equal to or more than 80% by weight and another vinyl monomer copolymerizable therewith equal to or less than 20% by weight.

Alkyl methacrylates (whose alkyl group contains 1 to 4 carbons) can be, for example, methyl methacrylate, ethyl methacrylate, n-propyl methacrylate, isopropyl methacrylate, n-butyl methacrylate, t-butyl methacrylate, sec-butyl methacrylate, isobutyl methacrylate, etc. Preferably, among these, methyl methacrylate is used. Each alkyl methacrylate exemplified above may be used alone, or two or more thereof may be used mixed with each other.

The copolymerizable vinyl monomers can be, for example, monofunctional monomers each having 1 double bond that is radical-polymerizable and multifunctional monomers each having two or more double bonds that are radical-polymerizable. Specifically, the monofunctional monomers each having 1 double bond that is radical-polymerizable can be, for example, methacrylic esters such as benzyl methacrylate and 2-ethylhexyl methacrylate (except the alkyl methacrylate (whose alkyl group contains 1 to 4 carbons)); acrylic esters such as methyl acrylate, ethyl acrylate, propyl acrylate, butyl acrylate, and 2-ethylhexyl acrylate; unsaturated carboxylic acids or acid anhydrides thereof such as acrylic acid, methacrylic acid, maleic acid, itaconic acid, maleic acid anhydride, and itaconic acid anhydride; hydroxy group-containing monomers such as 2-hydroxyethyl acrylate, 2-hydroxypropyl acrylate, monoglycerol acrylate, 2-hydroxyethyl methacrylate, 2-hydroxypropyl methacrylate, and monoglycerol methacrylate; nitrogen-containing monomers such as acrylamide, methacrylamide, acrylonitrile, methacrylonitrile, diacetoneacrylamide, and dimethylaminoethyl methacrylate; epoxy group-containing monomers such as allyl glycidyl ether, glycidyl acrylate, and glycidyl methacrylate; and styrene-based monomers such as styrene and α-methylstyrene. The multifunctional monomers each containing 2 or more double bonds that are radical-polymerizable can be, for example, diesters of unsaturated carboxylic acids of glycols such as ethylene glycol dimethacrylate, and butanediol dimethacrylate; unsaturated carboxylic acid alkenyl esters such as allyl acrylate, allyl methacrylate, and allyl cinnamate; polybasic acid polyalkenyl esters such as diallyl phthalate, diallyl maleate, triallyl cyanurate, and triallyl isocyanurate; esters of unsaturated carboxylic acids of polyalcohols such as trimethylolpropane triacrylate; and divinylbenzene. Each of the copolymerizable vinyl monomers exemplified above may be used alone or two or more thereof may be used mixed with each other.

For example, a radical initiator is used as the polymerization initiator in this embodiment.

The radical initiators can be, for example, azo compounds such as azobisisobutyronitrile, azobisdimethylvaleronitrile, azobiscyclohexanenitrile, 1,1'-azobis(1-acetoxy-1-phenylethane), dimethyl 2,2'-azobisisobutylate, and 4,4'-azobis-4-cyanovaleric acid; and organic peroxides such as benzoyl peroxide, lauroyl peroxide, acetyl peroxide, caprylyl peroxide, 2,4-dichlorobenzoyl peroxide, isobutyl peroxide, acetyl cyclohexylsulfonyl peroxide, t-butyl peroxypivalate, t-butyl peroxyneodecanoate, t-butyl peroxyneoheptanoate, t-butyl peroxy-2-ethylhexanoate, 1,1-di(t-butylperoxy)cyclohexane, 1,1-di(t-butylperoxy)-3,3,5-trimethylcyclohexane, 1,1-di(t-hexylperoxy)-3,3,5-trimethylcyclohexane, diisopropyl peroxydicarbonate, diisobutyl peroxydicarbonate, di-sec-butyl peroxydicarbonate, di-n-butyl peroxydicarbonate, bis(2-ethylhexyl) peroxydicarbonate, bis(4-t-butylcyclohexyl) peroxydicarbonate, t-amyl peroxy-2-ethylhexanoate, 1,1,3,3-tetramethylbutyl peroxy-ethylhexanoate, 1,1,2-trimethylpropyl peroxy-2-ethylhexanoate, t-butyl peroxy isopropyl monocarbonate, t-amyl peroxy isopropyl monocarbonate, t-butyl peroxy-2-ethylhexyl carbonate, t-butyl peroxy allyl carbonate, t-butyl peroxy isopropyl carbonate, 1,1,3,3-tetramethylbutyl peroxy isopropyl monocarbonate, 1,1,2-trimethyl propyl peroxy isopropyl monocarbonate, 1,1,3,3- tetramethylbutyl peroxy isononate, 1,1,2-trimethylpropyl peroxy-isononate, and t-butyl peroxybenzoate.

One of these polymerization initiators may be used alone or two or more thereof may be used mixed with each other.

The polymerization initiator is selected corresponding to the types of the polymer to be produced and the raw material monomer to be used. For example, though not especially limiting the present invention, with "τ" (sec) representing a half-life period of the polymerization initiator at the polymerization temperature and "θ" (sec) representing the average residence time in the reactor, a polymerization initiator (a radical initiator) is usable whose $\tau/\theta$ (–) is, for example, equal to or smaller than 0.1, is, preferably, equal to or smaller than 0.02, and is, more preferably, equal to or smaller than 0.01. When the value of $\tau/\theta$ is equal to or smaller than the above values, the polymerization initiator is sufficiently decomposed (as a result, generating radicals) in the reactor and the polymerization reaction can effectively be initiated. Because the polymerization initiator is sufficiently decomposed in the first reactor 10, any decomposition of the polymerization initiator causing the polymerization to be initiated in the connection line 15a can effectively be suppressed, and, as a result, any increase of the viscosity of the intermediate composition during its passage through the connection line 15a and any occlusion of the connection line 15a due to the intermediate composition can effectively be avoided.

Though the supply amount of the polymerization initiator (the radical initiator) is not especially limited, the supply amount generally is 0.001 to 1% by weight to the amount of the raw material monomer (the raw material monomer finally supplied to the reactor 10). When the mixture of the raw material monomer and the polymerization initiator is used in the two-stage polymerization raw material monomer tank 17a, the polymerization initiator can separately be supplied to the first reactor 10 and the second reactor 20. When the mixture of the raw material monomer and the polymerization initiator is supplied from the two-stage polymerization raw material monomer tank 17a to the second reactor 20 by the pump 19a, the total supply amount of the polymerization initiator supplied to the reactor 10 and the reactor 20 may be set to be within the above range to the total amount of the raw material monomer finally supplied to the reactor 10 and the raw material monomer newly supplied to the reactor 20.

In this embodiment, the polymerization inhibitors can be, for example, phenols such as hydroquinone, 2,4-dimethyl-6-tert-butylphenol, and hydroquinonemonomethyl ether; amines such as phenothiazine and diphenylamine; copper salts such as copper dibuthyl dithiocarbamate; manganese salts such as manganese acetate; nitro compounds; nitroso compounds, etc. The polymerization inhibitor to be used is properly selected corresponding to the polymer to be produced and the monomer to be used as the material thereof.

Though the supply amount of the polymerization inhibitor is not especially limited, the supply amount thereof may be set such that the content proportion of the polymerization inhibitor in the fluid containing the raw material monomer (the fluid supplied to the injection valve 50) is 0.0002 to 0.2% by weight. Setting this content proportion to be equal to or smaller than the above-described upper limit value effectively avoids any excessively high proportion of the polymerization inhibitor supplied to the reactor 20 and any coloring of the resin composition finally obtained. Setting this supply amount to be equal to or larger than the above-described lower limit value can effectively suppresses any polymerization of the raw material monomer in the clearance C of the injection valve 50 that causes occlusion of the injection valve 50.

In addition to the raw material monomer, the polymerization initiator, and the polymerization inhibitor, other arbitrary proper component(s) may be used such as, for example, the chain transfer agent, a mold release agent, a rubbery polymer such as butadiene and styrene-butadiene rubber (SBR), a thermal stabilizing agent, and an ultraviolet absorbing agent. The chain transfer agent is used to adjust the molecular weight of the produced polymer. The mold release agent is used to improve the moldability of the resin composition obtained from the polymer composition. The thermal stabilizing agent is used to suppress any thermal degradation of the produced polymer. The ultraviolet absorbing agent is used to suppress any degradation of the produced polymer due to ultraviolet rays.

The chain transfer agent may be either monofunctional or multifunctional chain transfer agent. Specifically, the chain transfer agent can be, for example, alkyl mercaptans such as n-propyl mercaptan, isopropyl mercaptan, n-butyl mercaptan, t-butyl mercaptan, n-hexyl mercaptan, n-octyl mercaptan, 2-ethylhexyl mercaptan, n-dodecyl mercaptan, and t-dodecyl mercaptan; aromatic mercaptans such as phenyl mercaptan and thiocresol; mercaptans each containing 18 or less carbons such as ethylene thioglycol; polyalcohols such as ethylene glycol, neopentyl glycol, trimethylolpropane, pentaerythritol, dipentaerythritol, tripentaerythritol, and sorbitol; polyalcohols whose hydroxyl group(s) is/are each esterified with thioglycolic acid or 3-mercaptopropionic acid, 1,4-dihydronaphthalene, 1,4,5,8-tetrahydronaphthalene, β-terpinene, terpinolene, 1,4-cyclohexadiene, hydrogen sulfide, etc. Each of these may be used alone or two or more thereof may be used in a combination.

Though the supply amount of the chain transfer agent differs depending on the type of the used chain transfer agent, and the like, and is therefore not especially limited, for example, when a mercaptan is used, the supply amount thereof is, preferably, 0.01 to 3% by weight, and is, more preferably, 0.05 to 1% by weight to the raw material monomer (the raw material monomer finally supplied to the reactor 10 or 20).

Though the mold release agent is not especially limited, the mold release agent can be, for example, esters of higher fatty acids, higher fatty alcohols, higher fatty acids, higher fatty acid amides, metal salts of higher fatty acids, etc. One type of mold release agent may be used, or two or more types thereof may be used.

Specifically, the esters of higher fatty acids can be, for example, saturated fatty acid alkyl esters such as methyl laurate, ethyl laurate, propyl laurate, butyl laurate, octyl laurate, methyl palmitate, ethyl palmitate, propyl palmitate, butyl palmitate, octyl palmitate, methyl stearate, ethyl stearate, propyl stearate, butyl stearate, octyl stearate, stearyl stearate, myristyl myristate, methyl behenate, ethyl behenate, propyl behenate, butyl behenate, and octyl behenate; unsaturated fatty acid alkyl esters such as methyl oleate, ethyl oleate, propyl oleate, butyl oleate, octyl oleate, methyl linoleate, ethyl linoleate, propyl linoleate, butyl linoleate, and octyl linoleate; saturated fatty acid glycerides such as lauric monoglyceride, lauric diglyceride, lauric triglyceride, palmitic monoglyceride, palmitic diglyceride, palmitic triglyceride, stearic monoglyceride, stearic diglyceride, stearic triglyceride, behenic monoglyceride, behenic diglyceride, and behenic triglyceride; and unsaturated fatty acid glycerides such as oleic monoglyceride, oleic diglyceride, oleic triglyceride, linolic monoglyceride, linolic diglyceride, and linolic triglyceride. Among these, preferably, methyl stearate, ethyl stearate, butyl stearate, octyl stearate, stearic monoglyceride, stearic diglyceride, stearic triglyceride, and the like, are used.

Specifically, the higher fatty alcohols can be, for example, saturated fatty alcohols such as lauryl alcohol, palmityl alcohol, stearyl alcohol, isostearyl alcohol, behenyl alcohol, myristyl alcohol, and cetyl alcohol; and unsaturated fatty alcohols such as oleyl alcohol and linolyl alcohol. Among these, preferably, stearyl alcohol is used.

Specifically, the higher fatty acids can be, for example, saturated fatty acids such as caproic acid, caprylic acid, capric acid, lauric acid, myristic acid, palmitic acid, stearic acid, arachidic acid, behenic acid, lignoceric acid, and 12-hydroxyoctadecanoic acid; and unsaturated fatty acids such as palmitoleic acid, oleic acid, linoleic acid, linolenic acid, cetoleic acid, erucic acid, and ricinoleic acid.

Specifically, the higher fatty acid amides can be, for example, saturated fatty acid amides such as lauric acid amide, palmitic acid amide, stearic acid amide, and behenic acid amide; unsaturated fatty acid amides such as oleic acid amide, linoleic acid amide, erucic acid amide; and amides such as ethylene-bis-lauric acid amide, ethylene-bis-palmitic acid amide, ethylene-bis-stearic acid amide, and N-oleyl stearoamide, etc. Among these, preferably, stearic acid amide and ethylene-bis-stearic acid amide are used.

The metal salts of higher fatty acids can be, for example, sodium salts, potassium salts, calcium salts, and barium salts of the above-described higher fatty acids, etc.

The use amount of the mold release agent is, preferably, adjusted to be 0.01 to 1.0 part by weight, and is, more preferably, adjusted to be 0.01 to 0.50 parts by weight to 100 parts by weight of the polymer contained in the polymer composition to be obtained.

Though the thermal stabilizing agent is not especially limited, the thermal stabilizing agent can be, for example, a phosphorous-based thermal stabilizing agent, an organic disulfide compound, etc. Among these, preferably, the organic disulfide compound is used. One type of thermal stabilizing agent may be used alone, or two or more types thereof may be used.

The phosphorus-based thermal stabilizing agents can be, for example, tris(2,4-di-t-butylphenyl)phosphite, 2-[[2,4,8,10-tetrakis(1,1-dimethylethyl)dibenzo[d,f][1,3,2]dioxaphosphepine-6-yl]oxy]-N,N-bis[2-[[2,4,8,10-tetrakis(1,1-dimethylethyl)dibenzo[d,f][1,3,2]dioxaphosphepine-6-yl]oxy]-ethyl]ethanamine, diphenyltridecyl phosphite, triphenyl phosphite, 2,2-methylenebis(4,6-di-tert-butylphenyl)octylphosphite, and bis(2,6-di-tert-butyl-4-methylphenyl)pentaerythritol diphosphite. Among these, preferably, 2,2-methylenebis(4,6-di-tert-butylphenyl)octylphosphite is used.

The organic disulfide compounds can be, for example, dimethyl disulfide, diethyl disulfide, di-n-propyl disulfide, di-n-butyl disulfide, di-sec-butyl disulfide, di-tert-butyl disulfide, di-tert-amyl disulfide, dicyclohexyl disulfide, di-tert-octyl disulfide, di-n-dodecyl disulfide, di-tert-dodecyl disulfide, etc. Among these, preferably, di-tert-alkyl disulfide is used, and, more preferably, di-tert-dodecyl disulfide is used.

Preferably, the use amount of the thermal stabilizing agent is 1 to 2,000 ppm by weight to the polymer contained in the polymer composition to be obtained. When the polymer composition (more specifically, a resin composition after devolatilization) is molded to obtain a molded article from the polymer composition according to the present invention, the molding temperature may be set to be at a somewhat higher temperature aiming at improving its molding efficiency. In this case, blending of the thermal stabilizing agent is more effective.

Types of the ultraviolet absorbing agent can be, for example, a benzophenone-based ultraviolet absorbing agent, a cyanoacrylate-based ultraviolet absorbing agent, a benzotriazole-based ultraviolet absorbing agent, a malonic ester-based ultraviolet absorbing agent, an oxalic anilide-based ultraviolet absorbing agent, etc. Each of these ultraviolet absorbing agents may be used alone, or two or more thereof may be used in a combination. Among these, preferably, the benzotriazole-based ultraviolet absorbing agent, the malonic ester-based ultraviolet absorbing agent, and the oxalic anilide-based ultraviolet absorbing agent are used.

The benzophenone-based ultraviolet absorbing agents can be, for example, 2,4-dihydroxybenzophenone, 2-hydroxy-4-methoxybenzophenone, 2-hydroxy-4-methoxybenzophenone-5-sulfonic acid, 2-hydroxy-4-octyloxybenzophenone, 4-dodecyloxy-2-hydroxybenzophenone, 4-benzyloxy-2-hydroxybenzophenone, 2,2'-dihydroxy-4,4'-dimethoxybenzophenone, etc.

The cyanoacrylate-based ultraviolet absorbing agents can be, for example, ethyl 2-cyano-3,3-diphenylacrylate, 2-ethylhexyl 2-cyano-3,3-diphenylacrylate, etc.

The benzotriazole-based ultraviolet absorbing agents can be, for example, 2-(2-hydroxy-5-methylphenyl)-2H-benzotriazole, 5-chloro-2-(3,5-di-t-butyl-2-hydroxyphenyl)-2H-benzotriazole, 2-(3-t-butyl-2-hydroxy-5-methylphenyl)-5-chloro-2H-benzotriazole, 2-(3,5-di-t-pentyl-2-hydroxyphenyl)-2H-benzotriazole, 2-(3,5-di-t-butyl-2-hydroxyphenyl)-2H-benzotriazole, 2-(2H-benzotriazole-2-yl)-4-methyl-6-(3,4,5,6-tetrahydrophthalimidylmethyl) phenol, 2-(2-hydroxy-5-t-octylphenyl)-2H-benzotriazole, etc.

Any of 2-(1-aryl alkylidene)malonate esters is generally used as the malonic ester-based ultraviolet absorbing agent, and, for example, dimethyl 2-(para-methoxybenzylidene)malonate or the like is usable.

Any of 2-alkoxy-2'-alkyloxalic anilides is generally used as the oxalic anilide-based ultraviolet absorbing agent, and, for example, 2-ethoxy-2'-ethyloxalic anilide or the like is usable.

Preferably, the use amount of the ultraviolet absorbing agent is 5 to 1,000 ppm by weight to the polymer contained in the polymer composition to be obtained.

In the raw material monomer tank 1, the above-described raw material monomer (of one type or as a mixture of two or more types thereof) is properly blended (together with the other component(s) such as the chain transfer agent when necessary). In the polymerization initiator tank 3, the above-described polymerization initiator is properly blended with the raw material monomer when necessary (together with the other component(s) such as the chain transfer agent when necessary). The polymerization initiator tank 3 may store the polymerization initiator alone, or may store the polymerization initiator in the form of a mixture with the raw material monomer and the polymerization initiator (that may further include other component(s) such as the chain transfer agent when necessary). In the two-stage polymerization raw material monomer tank 17a, the above-described mixture of the raw material monomer and the polymerization initiator is properly blended (together with the other component(s) such as the chain transfer agent when necessary). The two-stage polymerization raw material monomer tank 17a only has to store the fluid that includes at least the raw material monomer, while, preferably, the fluid includes the raw material monomer and the polymerization initiator as in this embodiment to facilitate the continuous polymerization in the second reactor 20. In the case where the supply port 21c is connected to the two-stage polymerization raw material monomer tank 17a through the pump 19a, when the raw material monomer and the polymerization initiator are stored in the form of the mixture thereof as in this embodiment, the polymerization initiator is mixed in advance with a part of the raw material monomer, and the possibility may, therefore, be avoided that the polymerization reaction locally takes place in the reactor 20 (as in the case, for example, where the polymerization initiator alone is supplied to the reactor 20).

(Two-Stage Polymerization Operation)

First Polymerization Step

The raw material monomer and the polymerization initiator are continuously supplied from the raw material monomer tank 1 and the polymerization initiator tank 3 that are the supply sources of the raw material monomer and the polymerization initiator, to the first reactor 10, through the supply port 11*a*. For example, the raw material monomer is continuously supplied from the raw material monomer tank 1, by the pump 5, and the polymerization initiator (preferably, the mixture of the raw material monomer and the polymerization initiator, that is also simply referred to as "polymerization initiator" herein) is continuously supplied from the polymerization initiator tank 3, by the pump 7, being merged together through the raw material supply line 9, into the first reactor 10 through the supply port 11*a* thereof.

The polymerization initiator may also be supplied from the polymerization initiator tank 3 by the pump 7 to the first reactor 10 through the supply port 11*c* as indicated by a dotted line in FIG. 1.

In supplying the polymerization initiator to the first reactor 10, when the mixture of the raw material monomer and the polymerization initiator is blended in the polymerization initiator tank 3, and is supplied therefrom, preferably, a ratio A:B is adjusted to be in a range from 80:20 to 98:2 as the supply flow rate "A" (kg/h) of the raw material monomer from the raw material monomer tank 1 to the supply flow rate "B" (kg/h) of the mixture of the raw material monomer and the polymerization initiator (whose content proportion of the polymerization initiator is 0.002 to 10% by weight) from the polymerization initiator tank 3.

Though the temperatures of the raw material monomer and the polymerization initiator supplied to the first reactor 10 are each not especially limited, the temperatures are factors that may degrade the thermal balance in the reactor to fluctuate the polymerization temperature, and, preferably, the temperatures are properly regulated by the heater/cooler (not depicted) before their supply to the reactor 10.

The raw material monomer and the polymerization initiator supplied to the first reactor 10 as described above are subjected to a continuous polymerization that is a continuous bulk polymerization in this embodiment (in other words, a polymerization with no solvent). This first polymerization step only has to advance the polymerization reaction partway, and the intermediate composition is continuously taken out from the effluent port 11*b* of the first reactor 10.

At the first polymerization step, the continuous polymerization may be conducted in the condition where the reactor is filled with the reaction mixture and substantially no gas phase is present therein (hereinafter, referred to as "fully filled condition"). This is especially suitable for the continuous bulk polymerization. The use of the fully filled condition can in advance prevent such problems from arising as that a gel adheres to and grows on the inner wall face of the reactor, and that the gel is contaminated into the reaction mixture to degrade the quality of the polymer composition finally obtained. Moreover, the use of the fully filled condition enables all the inner volume of the reactor to effectively be used as a reaction space, and high production efficiency can, thereby, be achieved.

The fully filled condition can easily be realized only by continuously supplying to and taking out from the first reactor 10 by positioning the effluent port 11*b* of the first reactor 10 at the top of the reactor as in this embodiment. The positioning of the effluent port at the top of the reactor is especially suitable for the continuous polymerization of a methacrylic ester monomer.

At the first polymerization step, the continuous polymerization may be conducted under the adiabatic condition (the state where substantially no heat is transferred to and from the outside of the reactor). This is especially suitable for the continuous bulk polymerization. The use of the adiabatic condition can prevent in advance such problems from arising as that a gel adheres to and grows on the inner wall face of the reactor, and that this gel is contaminated into the reaction mixture to degrade the quality of the polymer composition finally obtained. Moreover, the use of the adiabatic condition can stabilize the polymerization reaction, and can provide a self-regulating property to suppress any runaway reaction.

The adiabatic condition can be realized by causing the temperature in the first reactor 10 and the temperature of the outer wall face thereof to be substantially equal to each other. For example, this condition can be realized, by using of the above-described control means (not depicted), by adjusting the supply amounts of the raw material monomer and the polymerization initiator to the first reactor 10 by operating the pumps 5 and 7, respectively, such that the temperature of the outer wall face of the first reactor 10 set for the jacket (the temperature regulating means) 13 and the temperature in the first reactor 10 detected by the temperature sensor (the temperature detecting means) T are equal to each other. It is disadvantageous to set the temperature of the outer wall face of the reactor to be excessively higher than the temperature in the reactor, because an amount of extra heat is added to the inside of the reactor. A smaller difference is more advantageous in the temperature between the inside of the reactor, and the outer wall face of the reactor, and, for example, preferably, the temperature difference is adjusted to be within a range of about ±5° C.

The polymerization heat and the stirring heat generated in the first reactor 10 are generally carried away with the intermediate composition when the intermediate composition is taken out from the first reactor 10. The amount of the heat carried away by the intermediate composition is determined based on the flow rate and the specific heat of the intermediate composition, and the temperature of the polymerization reaction.

The temperature of the continuous polymerization at the first polymerization step is understood as the temperature in the first reactor 10 (detected by the temperature sensor T). The first polymerization step is conducted at, for example, a temperature within a range from 120 to 180° C., and, preferably, at a temperature within a range from 130 to 175° C. It should be noted, however, that the temperature in the reactor may fluctuate corresponding to various conditions until a static state is established therein.

The pressure for the continuous polymerization at the first polymerization step is understood as the pressure in the first reactor 10. This pressure is set to be a pressure equal to or higher than the vapor pressure of the raw material monomer at the temperature in the reactor to avoid generation of any gas of the raw material monomer in the reactor, and generally is about 1.0 to 2.0 MPa as a gauge pressure.

A time period for the components to be subjected to the continuous polymerization at the first polymerization step is understood as an average residence time in the first reactor 10. The average residence time to stay in the first reactor 10 may be set corresponding to the production efficiency of the polymer of the intermediate composition, and the like, and is not especially limited, but is, for example, 15 minutes to 6 hours. The average residence time to stay in the first reactor 10 can be regulated by varying the supply amount (the supply flow rate) of the raw material monomer, or the like, to the first reactor 10 by using of the pumps 5 and 7, while the average residence time significantly depends on the inner volume of the first reactor 10, and it is, therefore, important as described later how large the inner volume of the first reactor 10 and the inner volume of the second reactor 20 are designed.

In this manner, the intermediate composition is continuously taken out from the effluent port 11b of the first reactor 10. The obtained intermediate composition may contain the resulting polymer and the unreacted raw material monomer, and may further include the unreacted polymerization initiator, decomposed substances of the polymerization initiator, etc.

Though not limiting this embodiment, the polymerization conversion of the intermediate composition is, for example, 5 to 80% by weight. The polymerization conversion of the intermediate composition substantially corresponds to the polymer content proportion of the intermediate composition.

Raw Material Monomer Supply Step

The intermediate composition obtained as described above is taken out from the effluent port 11b of the first reactor 10, and then, it is continuously supplied through the supply port 21a thereof to the second reactor 20 through the connection line 15a.

The fluid containing at least the raw material monomer is concurrently supplied continuously from the two-stage polymerization raw material monomer tank 17a that is the supply source of the fluid containing at least the raw material monomer to the connection line 15a. For example, the fluid containing at least the raw material monomer (in this embodiment, containing the raw material monomer and the polymerization initiator) is continuously supplied from the two-stage polymerization raw material monomer tank 17a, by the pump 19a, to the connection line 15a, through the replenishing line 15b and the injection valve 50, and a new raw material monomer (and a new polymerization initiator in this embodiment) is, thereby, added to the intermediate composition. In this case, the injection valve 50 is set to be in the full open state described above with reference to FIG. 2 (b). The temperature of the fluid containing at least the raw material monomer supplied from the two-stage polymerization raw material monomer tank 17a to the connection line 15a is not especially limited, while the temperature is a factor that may degrade the thermal balance in the reactor to fluctuate the polymerization temperature, and, preferably, the temperature is properly regulated by the heater/cooler (not depicted) before the supply of the fluid to the connection line 15a.

In supplying the fluid containing at least the raw material monomer to the intermediate composition, when the mixture of the raw material monomer and the polymerization initiator is blended in the polymerization initiator tank 3 and the two-stage polymerization raw material monomer tank 17a, and is supplied therefrom, preferably, a ratio A:($B_1$+$B_2$) is adjusted to be in a range from 80:20 to 98:2 and a ratio $B_1$:$B_2$ is adjusted to be in a range from 10:90 to 90:10 as the supply flow rate "A" (kg/h) of the raw material monomer from the raw material monomer tank 1, the supply flow rate "$B_1$" (kg/h) of the mixture of the raw material monomer and the polymerization initiator (whose content proportion of the polymerization initiator is 0.002 to 10% by weight) from the polymerization initiator tank 3, and the supply flow rate "$B_2$" (kg/h) of the mixture of the raw material monomer and the polymerization initiator (whose content proportion of the polymerization initiator is 0.002 to 10% by weight) from the polymerization initiator tank 17a.

In this manner, the fluid containing at least the raw material monomer is supplied from the replenishing line 15b to the intermediate composition through the injection valve 50 in the course of the passage of the intermediate composition from the effluent port 11b of the first reactor 10 to the supply port 21a of the second reactor 20 through the connection line 15a.

Though not essential to the present invention, when the connection line 15a includes the jacket 16 or the cooler 40 as a cooling means, the intermediate composition taken out from the effluent port 11b of the first reactor 10 may continuously be cooled by the jacket 16 or the cooler 40, alone or together with the fluid containing at least the raw material monomer supplied from the replenishing line 15b through the injection valve 50, in the course of its continuous supply through the connection line 15a to the second reactor 20 through the supply port 21a.

Though not essential to the present invention, preferably, a mixing means is provided in the connection line 15a. The provision of the mixing means causes the intermediate composition (or the mixture of the intermediate composition and the fluid containing at least the raw material monomer) flowing through the connection line 15a to be homogeneously mixed, therefore, it causes the temperature distribution thereof to tend to be homogenized, and enables suppression of any occlusion of the connection line 15a by the intermediate composition (or the above-described mixture). When the mixing means is provided in the connection line 15a, a static mixer or a dynamic mixer may be provided in the connection line 15a, or the cooler 40 including both of the mixing means and the cooling means may be provided in the connection line 15a.

The degree of the cooling may vary depending on the difference between the temperature in the first reactor 10 and the temperature in the second reactor 20, or the like, as in, for example, the above-described preferred exemplary control, and is adjusted corresponding to a desired polymerization temperature and a desired polymerization conversion in the second reactor 20. For example, the adjustment may be conducted such that the temperature of the mixture at the supply port 21a of the second reactor 20 is, for example, lower by 5 to 80° C. than the temperature of the intermediate composition at the effluent port 11b of the first reactor 10.

Second Polymerization Step

A second polymerization step is one conducted in series with and after the first polymerization step.

As described above, the mixture of the intermediate composition taken out from the effluent port 11b of the first reactor 10 and the fluid containing at least the raw material monomer supplied from the replenishing line 15b through the injection valve 50 is continuously supplied from the connection line 15a to the second reactor 20 through the supply port 21a. The mixture is further subjected to a continuous polymerization, that is, in this embodiment, a continuous bulk polymerization in the second reactor 20. The second polymerization step is conducted to advance the polymerization reaction until a desired polymerization conversion is achieved, and, at this step, the polymer composition (or the polymerization syrup) is continuously taken out from the effluent port 21b of the second reactor 20.

The second polymerization step will be described below mainly for the points different from the first polymerization step, and explanations similar to those for the first polymerization step will apply unless otherwise particularly explained.

Though not essential to the present invention, a part of the fluid containing at least the raw material monomer (preferably, the mixture of the raw material monomer and the polymerization initiator) supplied from the two-stage polymerization raw material monomer tank 17a by the pump 19a may be supplied to the second reactor 20 through other supply port 21c.

The temperature of the fluid containing at least the raw material monomer supplied from the polymerization initiator tank 17a to the second reactor 20 through the other support port 21c is not especially limited, while the temperature is a factor that may degrade the thermal balance in the reactor to fluctuate the polymerization temperature, and therefore, preferably, the temperature is properly regulated by a heater/cooler (not depicted) before the supply of the fluid to the reactor 20.

Though not essential to the present invention, preferably, by using of the jacket 16 or the cooler 40 provided on the connection line 15a as a cooling means, the intermediate composition taken out from the first reactor or the mixture of the intermediate composition and the fluid containing at least the raw material monomer supplied from the replenishing line is cooled before the supply of the intermediate composition and/or the mixture to the second reactor. Thereby, even when any polymerization heat is generated in the second reactor 20, the continuous polymerization can be conducted avoiding occurrence of any temperature uneven state in the second reactor 20, and a high polymerization conversion can be achieved suppressing the temperature in the second reactor 20 to be low, that is, the productivity of the polymer can be increased. As a result, a polymer composition excellent in the thermal stability and the heat resistance can efficiently be obtained. The supply temperature of the mixture to the second reactor 20 is regulated by using of the jacket 16 or the cooler 40 that may be provided on the connection line 15a as a cooling means, and this supply temperature is, thereby, maintained to be in a constant. The continuous polymerization can, thereby, be more stably conducted at the second polymerization step.

At the second polymerization step, the continuous polymerization may also be conducted in the fully filled condition. This is especially suitable for a continuous bulk polymerization. The use of the fully filled condition can prevent in advance such problems from arising as that a gel adheres to and grows on the inner wall face of the reactor, and that this gel is contaminated into the reaction mixture to degrade the quality of the polymer composition finally obtained. Moreover, the use of the fully filled condition also enables all the inner volume of the reactor to be used as a reaction space, and high production efficiency can, thereby, be achieved.

The fully filled condition can easily be realized only by continuously executing the supply to and the taking out from the second reactor 20 by positioning the effluent port 21b of the second reactor 20 at the top of the reactor as in this embodiment. The positioning of the effluent port at the top of the reactor is especially suitable for a continuous polymerization of a methacrylic ester monomer.

At the second polymerization step, the continuous polymerization may also be conducted under the adiabatic condition. This is especially suitable for a continuous bulk polymerization. The adiabatic condition can prevent in advance such problems from arising as that a gel adheres to and grows on the inner wall face of the reactor, and that this gel is contaminated into the reaction mixture to degrade the quality of the polymer composition finally obtained. Moreover, the adiabatic condition can stabilize the polymerization reaction, and can provide a self-regulating property to suppress any runaway reaction.

The adiabatic condition can be realized by causing the temperature in the second reactor 20 and the temperature of the outer wall face thereof to be substantially equal to each other. For example, this state can be realized, by using of the above-described control means (not depicted), by adjusting the supply amounts of the raw material monomer and the polymerization initiator to the second reactor 20 by operating the pumps 5, 7 and 19a such that the temperature of the outer wall face of the second reactor 20 set for the jacket (the temperature regulating means) 23 and the temperature in the second reactor 20 detected by the temperature sensor (the temperature detecting means) T are equal to each other. Herein, it is disadvantageous to set the temperature of the outer wall face of the reactor to be excessively higher than the temperature in the reactor, because an amount of extra heat is added to the inside of the reactor. A smaller difference is more advantageous in the temperature between the inside of the reactor and the outer wall face of the reactor. For example, preferably, the temperature difference is adjusted to be within a range of about ±5° C.

The polymerization heat and the stirring heat generated in the second reactor 20 are generally carried away with the polymer composition when the polymer composition is taken out from the second reactor 20. The amount of the heat carried away by the polymer composition is determined based on the flow rate and the specific heat of the polymer composition, and the temperature of the polymerization reaction.

The temperature of the continuous polymerization at the second polymerization step is understood as the temperature in the second reactor 20. The second polymerization step is conducted, for example, at a temperature within a range from 120 to 180° C., and, preferably, at a temperature within a range from 130 to 175° C. Preferably, the temperature for the second polymerization step is different from the temperature of the continuous polymerization at the first polymerization step by 10° C. or less. At the second polymerization step, though the temperature may be increased by the polymerization heat generated by the polymerization reaction, preferably, the difference can be reduced between the temperature for the second polymerization step and the temperature for the first polymerization step by conducting intermediate cooling. As a result, the thermal stability and the heat resistance are improved with being compared to the case where the polymerization is conducted at a lower temperature in the first reactor, and the polymerization is, thereafter, conducted at a high temperature in the second reactor.

A pressure for the continuous polymerization at the second polymerization step is understood as the pressure in the second reactor 20. This pressure is generally about 1.0 to 2.0 MPa as a gauge pressure, and may be equal or similar to the pressure for the first polymerization step.

A time period during which the components are subjected to the continuous polymerization at the second polymerization step is understood as the average residence time in the second reactor 20. The average residence time in the second reactor 20 may be set corresponding to the production efficiency of the polymer in the polymer composition, or the like, and is not especially limited, while the average residence time is, for example, 15 minutes to 6 hours. The ratio of the average residence time of the second reactor 20 to the average residence time of the first reactor 10 is, preferably, 9/1 to 1/9, and is, more preferably, 8/2 to 2/8. The average residence time of the second polymerization step may be equal or similar to the average residence time of the first polymerization step, but, preferably, is different therefrom. The average residence time of the second reactor 20 can be regulated by varying the supply amount (the supply flow rate) of the raw material monomer, or the like, to the second reactor 20 by using of the pumps 5, 7 and 19a, while the average residence time of the second reactor 20 significantly depends on the inner volume of the second reactor 20, and it is therefore important, as described later, how large the inner volume of the first reactor 10 and the inner volume of the second reactor 20 are designed.

As described above, the polymer composition is continuously taken out from the effluent port 21b of the second reactor 20. The obtained polymer composition may contain the produced polymer, and may further contain the unreacted raw material monomer(s), the unreacted polymerization initiator(s), the decomposed substances of the polymerization initiator(s), etc.

Though the polymerization conversion of the polymer composition does not limit this embodiment, the polymerization conversion is, for example, 30 to 90% by weight. Herein, the polymerization conversion of the polymer composition substantially corresponds to the content proportion of the polymer in the polymer composition. The productivity of the polymer becomes higher as the polymerization conversion is higher, while the viscosity is increased of those from the intermediate composition to the polymer composition resulting in necessity for significant power for the stirring. The productivity of the polymer becomes lower as the polymerization conversion is lower, and the load becomes significant to recover the unreacted raw material monomer(s). Preferably, a proper polymerization conversion is, therefore, set as a target or a guide.

According to the two-stage polymerization operation of this embodiment, the cooling means of the connection line is controlled to, preferably, cause the temperature in the connection line in the vicinity of the supply port of the second reactor to be lower than the temperature in the first reactor detected by the temperature detecting means of the first reactor such that the polymerization temperature in the second reactor 20 can be suppressed to be low with achieving a desired polymerization conversion. A polymer composition excellent in the thermal stability and the heat resistance can, thereby, be obtained with an excellent productivity.

Generally, a higher polymerization temperature tends to provide a lower syndiotacticity of the obtained polymer, and tends to provide a lower heat resistance of the resin composition finally obtained. Preferably, the polymerization is, therefore, caused to take place at a low temperature to obtain a resin composition having a high heat resistance. When the continuous polymerization is conducted only in one stage at a low temperature, a long time period is, however, necessary to achieve a desired polymerization conversion, and therefore, a large reactor, and, as a result, a large space are necessary to realize a long average residence time. This continuous polymerization is, therefore, inefficient. When the average residence time is longer than necessary, the production of the oligomer(s) such as a dimer and a trimer is increased, and the heat resistance of the resin composition obtained from the polymer composition may be degraded.

In addition, the amount of the polymerization initiator may be set corresponding to other conditions such as the polymerization temperature, the desired polymerization conversion, the average residence time, etc. A larger amount of polymerization initiator is necessary for achieving the desired polymerization conversion as the polymerization temperature is lower, and as the average residence time is shorter, while the amount is increased of polymerization terminal ends each including an unstable unsaturated bond (terminal polymers) remaining in the polymer composition as the amount of the polymerization initiator is increased. The thermal stability of the resin composition finally obtained, therefore, tends to be degraded. When the polymerization temperature is excessively high, a large amount of polymerization terminal ends each including an unsaturated bond attributed to the polymerization initiator (the terminal polymers) is produced in the polymer composition, and the thermal stability of the resin composition finally obtained tends to be degraded.

In this embodiment, for example, the continuous polymerization can be conducted at the temperature in a predetermined range (for example, 120 to 180° C.) at the first polymerization step, and the continuous polymerization can, thereafter, be further conducted at the temperature in the same or similar range as that for the first polymerization step (for example, 120 to 180° C.) at the second polymerization step. For example, the difference between the temperature of the continuous polymerization at the first polymerization step and the temperature of the continuous polymerization at the second polymerization step is reduced by conducting the cooling for the connection line between the first reactor and the second reactor, and by adding the new polymerization initiator into the second reactor, and the adiabatic polymerization can, thereafter, be conducted. As a result, the continuous polymerization can efficiently be conducted in a smaller space with being compared to the case where the continuous polymerization is conducted in one stage at a low temperature, and the polymer composition can be obtained that is suitable for acquiring the resin composition that is excellent in heat resistance and that includes fewer impurities such as a gel generated in the adiabatic polymerization, with being compared to the case where the continuous polymerization is conducted in the one stage at a high temperature.

In this embodiment, for example, the time period during which the components are subjected to the continuous polymerization at the first polymerization step and the time period during which the components are subjected to the continuous polymerization at the second polymerization step can be caused to differ from each other. For example, the average residence time of the first reactor and the average residence time of the second reactor can be caused to differ from each other by designing the inner volume of the first reactor and the inner volume of the second reactor to differ from each other. The average residence time of the first reactor and the average residence time of the second reactor can also be caused to differ from each other by adding the new polymerization initiator together with the raw material monomer into the second reactor. When the average residence time is increased, the amount of the polymerization initiator supplied into the reactor can further be reduced. The thermal stability of the overall resin composition can, therefore, be adjusted, and a polymer composition can be obtained that is suitable for obtaining a resin composition with a high thermal stability by controlling the residence time and the polymerization conversion in each of the first reactor and the second reactor.

How the polymerization reaction conditions are set for each of the first polymerization step and the second polymerization step may be different between the first polymerization step and the second polymerization step corresponding to the polymer to be produced, the raw material monomer and the polymerization initiator to be used, the desired heat resistance, the desired thermal stability, the desired production efficiency, etc.

Devolatilization Step

As described above, the polymer composition (the polymerization syrup) taken out from the effluent port 21b of the second reactor 20 may include the unreacted raw material monomer(s), the polymerization initiator(s), and the like, in addition to the resulting polymer. Though the polymer composition does not limit this embodiment, preferably, the polymer composition is subjected to a devolatilization to separate and recover the raw material monomer(s).

For example, the polymer composition is transferred to the preheater 31 through the effluent line 25. The polymer composition is supplied, by using of the preheater 31, with a part or all of an amount of heat necessary for volatilizing the volatile components that mainly include the unreacted raw material monomer(s). The polymer composition is, thereafter, transferred to the devolatilizing extruder 33 through a pressure adjusting valve (not depicted), and the volatile components are at least partially removed by using of the devolatilizing extruder. A residual extruded object is shaped into a pellet, and is discharged from the discharge line 35. A resin composition including a methacrylic ester polymer is, thereby, produced in the form of pellet.

A method described in Japanese Patent Publication No. 4-48802 is advantageously employed as a method of transferring the above-described polymer composition. Any of methods described in, for example, Japanese Laid-Open Patent Publication No. 3-49925, Japanese Patent Publication Nos. 51-29914, 52-17555, and 1-53682, and Japanese Laid-Open Patent Publication No. 62-89710 or the like is advantageously employed as a method conducted by using of a devolatilizing extruder.

During or after devolatilization and extrusion of the polymer composition by using of the above-described devolatilizing extruder, when necessary, the polymer composition or the extruded object can be added with a lubricant such as a higher alcohol and a higher fatty acid ester, an ultraviolet absorbing agent, a thermal stabilizing agent, a coloring agent, an antistatic agent, or the like, to include that agent into the resin composition.

The volatile components removed by the devolatilizing extruder 33 include the unreacted raw material monomer as the main component thereof and also include impurities such as the impurities originally contained in the raw material monomer, additives used when necessary, volatile by-products generated in the polymerization steps, oligomers such as a dimer and a trimer, and decomposed substances of the polymerization initiator, etc. Generally, when the amount of the impurities increases, the resulting resin composition becomes colored, and this increase is disadvantageous. Herein, the volatile components removed by the devolatilizing extruder 33 (that include the unreacted raw material monomer as the main component thereof and also include above-described impurities, and the like) may be caused to pass through a monomer recovery column (not depicted), and may be treated by means of distillation, adsorption, or the like, in the monomer recovery column to remove the impurities from the above-described volatile components. The unreacted raw material monomer can, thereby, be recovered with a high purity, and can be advantageously reused as the raw material monomer for the polymerization. For example, in the monomer recovery column, the unreacted raw material monomer may be recovered with a high purity as a distillate liquid from the top of the monomer recovery column, by using of a continuous distillation, and may be transferred to and recycled in the raw material monomer tank 1 after being stored in the recovery tank 37, or may be transferred to and recycled in the raw material monomer tank 1, without being stored in the recovery tank 37. On the other hand, the impurities removed in the monomer recovery column may be discarded as wastes.

To prevent the recovered raw material monomer from advancing the polymerization reaction in the recovery tank 37 and the raw material monomer tank 1, preferably, the polymerization inhibitor is caused to be present in the recovery tank 37 or the raw material monomer tank 1 at a rate of, for example, 2 to 8 ppm by weight to the raw material monomer, and, in addition, more preferably, the oxygen concentration in the gas phase in each of the recovery tank 37 and the raw material monomer tank 1 is set to be 2 to 8% by volume. When the recovered raw material monomer is desired to be stored in the recovery tank 37 for a long time, the recovered raw material monomer is desirably stored at a low temperature of, for example, 0 to 5° C.

As described above, the polymer composition is produced by the two-stage polymerization operation and the resin composition in the form of pellet is properly obtained. The polymer composition obtained by the two-stage polymerization operation (or the resin composition obtained therefrom) has high quality and is also excellent, for example, in the physical properties such as the heat resistance and the thermal stability.

(One-Stage Polymerization Operation)

Polymerization Step

The polymerization step in the one-stage polymerization operation may be conducted same or similarly to the above-described first polymerization step in the above-described two-stage polymerization operation. This polymerization step only has to be a polymerization step that causes the polymerization reaction to take place to a desired degree, and the intermediate composition is continuously taken out from the effluent port 11b of the first reactor 10. Though the polymerization conversion of the intermediate composition does not limit this embodiment, the polymerization conversion is, for example, 5 to 80% by weight.

Raw Material Monomer Supply Step

The intermediate composition obtained as described above is taken out from the effluent port 11b of the first reactor 10, and is, thereafter, continuously supplied to the second reactor 20 through the connection line 15a and the supply port 21a.

The fluid containing at least the raw material monomer is concurrently supplied continuously from the one-stage polymerization raw material monomer tank 17b that is the supply source of the fluid containing at least the raw material monomer to the connection line 15a. For example, the fluid containing at least the raw material monomer (in this embodiment, containing the raw material monomer and the polymerization initiator) is continuously supplied from the one-stage polymerization raw material monomer tank 17b, by the pump 19b, to the connection line 15a through the replenishing line 15b and the injection valve 50, and a new raw material monomer (and a polymerization initiator in this embodiment) is, thereby, added to the intermediate composition. In this case, the injection valve 50 is set to be in the full closure state described above with reference to FIG. 2 (*a*). Herein, the fluid containing at least the raw material monomer is supplied to the connection line 15a by the clearance C. The temperature of the fluid containing at least the raw material monomer supplied from the one-stage polymerization raw material monomer tank 17b to the connection line 15a is not especially limited, while the temperature is a factor that may fluctuate the polymerization temperature, and, preferably, the temperature is properly regulated by a heater/cooler (not depicted) before the supply of the fluid to the connection line 15a.

In supplying the fluid containing at least the raw material monomer to the intermediate composition, when the mixture of the raw material monomer and the polymerization initiator is blended in the polymerization initiator tank 3 and is supplied therefrom, and the mixture of the raw material monomer and the polymerization inhibitor is blended in the one-stage polymerization raw material monomer tank 17a and is supplied therefrom, preferably, a ratio A':($B_1$'+$B_2$') is adjusted to be in a range from 70:30 to 95:5, and a ratio $B_1$:$B_2$ is adjusted to be in a range from 30:70 to 95:5, as the supply flow rate A' (kg/h) of the raw material monomer from the raw material monomer tank 1, the supply flow rate $B_1$' (kg/h) of the mixture of the raw material monomer and the polymerization initiator (whose content proportion of the polymerization initiator is 0.002 to 10% by weight) from the polymerization initiator tank 3, and the supply flow rate $B_2$' (kg/h) of the mixture of the raw material monomer and the polymerization inhibitor (whose content proportion of the polymerization inhibitor is 0.0002 to 0.2% by weight) from the polymerization initiator tank 17b.

In this manner, the fluid containing at least the raw material monomer is supplied from the replenishing line 15b to the intermediate composition through the injection valve 50 in the course of the passage of the intermediate composition from the effluent port 11b of the first reactor 10 to the supply port 21a of the second reactor 20 through the connection line 15a.

Thus, the supply of the fluid containing at least the raw material monomer from the replenishing line 15b to the intermediate composition through the injection valve 50 can prevent the monomer from staying in the replenishing line 15b to the second reactor 20 and polymerizing at this point causing occlusion of the replenishing line 15b. Moreover, the fluid containing at least the raw material monomer contains the polymerization inhibitor, as in this embodiment, and the polymerization can, thereby, be promptly discontinued, that may take place in the part downstream the combining part of the replenishing line 15b and the connection line 15a, or in the connection line 15a, in some cases. In addition, because the inner volume of the body 52 in the full closure state is 1 to 30% of the inner volume of the body 52 in the full open state, the supply flow rate of the fluid containing at least the raw material monomer supplied to the connection line 15a, and, as a result, the supply flow rate of the polymerization inhibitor contained in the fluid is slight, even when the fluid containing at least the raw material monomer contains the polymerization inhibitor. The coloring attributed to the polymerization inhibitor can effectively be suppressed for the resin composition finally obtained from the polymer composition.

Though not essential to the present invention, when the connection line 15a includes the jacket 16 or the cooler 40 as a cooling means, the intermediate composition taken out from the effluent port 11b of the first reactor 10 may continuously be cooled by the jacket 16 or the cooler 40, alone or together with the fluid containing at least the raw material monomer supplied from the replenishing line 15b through the injection valve 50, in the course of the continuous supply of the intermediate composition to the second reactor 20 through the connection line 15a and the supply port 21a.

Though not essential to the present invention, when a mixing means is provided in the connection line 15a, the intermediate composition (or the mixture of the intermediate composition and the fluid containing at least the raw material monomer) flowing through the connection line 15a is homogeneously mixed, and therefore, tends to easily have even temperature distribution, and can suppress any occlusion of the connection line 15a caused by the intermediate composition (or the above-described mixture).

Passage Step

As described above, the mixture of the intermediate composition taken out from the effluent port 11b of the first reactor 10 and the fluid containing at least the raw material monomer supplied from the replenishing line 15b through the injection valve 50 is continuously supplied from the connection line 15a to the second reactor 20 through the supply port 21a. This mixture passes through the second reactor 20, and is continuously taken out from the effluent port 21b of the second reactor 20 as the polymer composition (or the polymerization syrup).

The second reactor 20 is used in an arbitrary proper method as long as the second reactor 20 causes the mixture from the connection line 15a to pass therethrough. The second reactor 20 may or may not be placed under the adiabatic condition. The temperature of the mixture in the passage step is understood as the temperature in the second reactor 20, and is not especially limited, while this temperature may be, for example, a temperature within a range from 120 to 180° C. A pressure for the passage step is understood as the pressure in the second reactor 20, and is not especially limited, while this pressure is generally about 1.0 to 2.0 MPa as a gauge pressure, and may be equal or similar to the pressure for the polymerization step. The time period necessary for the passage step is understood as the average residence time of the second reactor 20, is not especially limited, and may be arbitrary depending on the continuous polymerization apparatus to be used, and its operational conditions, while the time period is, for example, 15 minutes to 6 hours.

The mixture passing through the second reactor 20 is continuously taken out from the effluent port 21b thereof, as a polymer composition, as described above. The obtained polymer composition may contain the produced polymer, and may further contain the unreacted raw material monomer(s), the unreacted polymerization initiator(s), the decomposed substances of the polymerization initiator(s), the unreacted polymerization inhibitor(s), the decomposed substances of the polymerization inhibitor(s), etc.

The polymerization conversion of the polymer composition may be substantially equal or similar to the polymerization conversion of the intermediate composition, and does not limit this embodiment, while the polymerization conversion is, for example, 5 to 80% by weight.

Devolatilization Step

The devolatilization step in the one-stage polymerization operation may be conducted same or similarly to the devolatilization step in the above-described two-stage polymerization operation.

As described above, the polymer composition is produced by the one-stage polymerization operation, and the resin composition is properly obtained in the form of pellet. The polymer composition obtained by the one-stage polymerization operation (or the resin composition obtained therefrom) generally has a lower quality than that obtained by the two-stage polymerization operation, and may be inferior in, for example, the physical properties such as the heat resistance and the thermal stability. Therefore, by using of the same continuous polymerization apparatus, the high quality polymer composition can be obtained by the two-stage polymerization operation and the low quality polymer composition can be obtained by the one-stage polymerization operation. Even when the continuous polymerization apparatus is operated switching its operation between the two-stage polymerization operation and the one-stage polymerization operation, as described above, any occlusion of the replenishing line can effectively be prevented because the injection valve 50 is used that includes the clearance C in the full closure state. Even when the polymerization inhibitor is added in addition to the raw material monomer in the one-stage polymerization operation, the injection valve 50 is set to be in the full closure state (including however the clearance C), the amount of the polymerization inhibitor contained in the polymer composition is small and any coloring of the resin composition finally obtained that is attributed to the polymerization inhibitor can, therefore, be effectively suppressed.

In this embodiment, the continuous bulk polymerization apparatus has been described whose first reactor and second reactor are usable to conduct a continuous bulk polymerization, respectively. The continuous polymerization apparatus according to the present invention is, however, not limited to those described above, and one or both of the first reactor and the second reactor may be usable to conduct the continuous solution polymerization. In such an aspect, because a solvent is used for the solution polymerization, the continuous polymerization apparatus further includes a solvent tank, and a supply line and a pump (a supply means) associated with the solvent tank to supply the solvent to the predetermined reactor used to conduct the solution polymerization, in addition to the same or similar configurations as those of the continuous polymerization apparatus described above with reference to FIGS. 1 to 4. The solvent tank, and the supply line and the pump (the supply means) associated with the solvent tank are not especially limited, and those same or similar to the traditionally used ones are usable. The solvent may be supplied to the predetermined reactor used to conduct the solution polymerization after being mixed with the raw material monomer and/or the polymerization initiator, or may be supplied directly to the predetermined reactor used to conduct the solution polymerization. In the predetermined reactor, the polymerization step is conducted same or similarly to the polymerization step described above with reference to FIGS. 1 to 4 except the fact that the solvent is used in the polymerization reaction. The solvent is properly set corresponding to the raw material monomer, or the like, of the solution polymerization reaction, is not especially limited, and can be, for example, toluene, xylene, ethylbenzene, methylisobutyl ketone, methyl alcohol, ethyl alcohol, octane, decane, cyclohexane, decalin, butyl acetate, pentyl acetate, etc. A ratio C:D of the supply flow rate "C" (kg/h) of the raw material monomer to the predetermined reactor used to conduct the solution polymerization to the supply flow rate "D" (kg/h) of the solvent to the predetermined reactor is, for example, 70:30 to 95:5, and are, preferably, 80:20 to 90:10, while this ratio is not limited thereto.

The continuous polymerization apparatus and the production method of a polymer composition according to the present invention have been described above in detail through the embodiment according to the present invention. According to the present invention, a novel continuous polymerization apparatus is provided. When this continuous polymerization apparatus is used in the two-stage polymerization operation, the polymerization can be conducted in at least two stages in series by using of at least the first reactor and the second reactor. The polymerization reaction conditions can, therefore, be individually set for each of the first polymerization step and the second polymerization step, such as, for example, the temperature, the time period (the average residence time), and the amount of the polymerization initiator (the proportion of the polymerization initiator to the raw material monomer). Preferably, the cooling means of the connection line is controlled corresponding to a desired polymerization temperature and a desired polymerization conversion for the second reactor such that the temperature in the connection line in the vicinity of the supply port of the second reactor is lower than the temperature in the first reactor detected by the temperature detecting means of the first reactor. The syndiotacticity of the polymer contained in the resin composition finally obtained can, thereby, be controlled, and the polymer composition can more efficiently be produced that is suitable for obtaining the resin composition having high heat resistance and high thermal stability. The continuous polymerization apparatus can also be used with its operation switched to the one-stage polymerization operation, and the polymer composition can, thereby, be obtained whose quality is different from that of the polymer composition obtained by the two-stage polymerization operation.

The present invention is not limited to the above-described embodiment, and various modifications can be made thereto. For example, the polymerization may be conducted in three or more stages in series by using of three or more reactors. Preferably, the production method of a polymer composition according to the present invention is continuously conducted by using of the continuous polymerization apparatus according to the present invention, while the production method may be conducted batch-wise.

According to another aspect of the present invention, the injection valve 50 itself is provided that has been described above with reference to FIG. 2. The injection valve according to the present invention is used being provided in the connection line 15a connecting the first reactor 10 and the second reactor 20 of the continuous polymerization apparatus, in the above-described embodiment, while the location of the injection valve is not limited thereto, and the injection valve may be provided at an arbitrary proper position of the polymerization apparatus. The injection valve 50 is usable as a valve associated with at least one of the first reactor 10 and the second reactor 20, with reference to FIGS. 1, 3 and 4, and may be provided, for example, at the supply port(s) 11a and/or 21a, or may be provided at the other supply port(s) 11c and/or 21c when these ports are present. The injection valve according to the present invention is usable to supply the fluid containing at least the raw material monomer to directly or indirectly the reactor used to conduct the polymerization, and, preferably, to the reactor used to conduct a continuous polymerization. The use of the injection valve according to the present invention is, however, not limited to those described above, and the injection valve is usable widely for various uses to which the injection valve is applicable.

The polymer composition obtained by using of the production method according to the present invention may advantageously be used as a material of a molded article, and the molded article obtained thereby has an advantage that the molded article has high heat resistance and high thermal stability. For example, the molded article can be obtained by molding the polymer composition obtained by using of the production method according to the present invention (more specifically, the resin composition after devolatilization) alone or together with an arbitrary other proper component(s) in an arbitrary molding method such as injection molding or extrusion molding. The polymer composition obtained by using of the production method according to the present invention is advantageously used for obtaining a molded article by injection molding, and the molded article can be obtained with suppressed generation of any silver streaks and with good moldability, by using of, above all, the polymer composition obtained by the two-stage polymerization operation. Especially, because the resin composition containing a methacrylic ester polymer has excellent transparency, the molded article obtained from the resin composition by injection molding has high transparency, suppressed generation of silver streaks, and good moldability, and is therefore advantageously utilized as a light guide plate used in a member of a backlight unit of each of various types of liquid crystal displays, or the like, and as a vehicle member such as a rear lamp cover, a head lamp cover, a visor, or a meter panel.

The injection molding can be conducted by filling (injecting) into a mold having a predetermined thickness with at least the polymer composition obtained by using of the production method according to the present invention in a melted state, applying thereafter cooling thereto, and releasing the molded article that is molded from the mold. Specifically, for example, the polymer composition obtained by using of the production method according to the present invention (more specifically, the resin composition after the devolatilization) alone or together with other arbitrary proper component(s) is supplied into a molding machine through a hopper, a screw is rotated to concurrently be retracted to measure the resin composition in a cylinder of the molding machine, the resin composition is melted in the cylinder, a mold (for example, a metal mold) is filled with the melted resin composition under a pressure, the pressure is maintained for a specific time period until the mold is sufficiently cooled, the mold is thereafter opened to take out the molded article therefrom, and the molded article can thereby be manufactured.

According to another aspect of the present invention, a molded article is also provided that is obtained from the polymer composition obtained by using of the production method according to the present invention. Herein, the conditions may properly be set and are not especially limited, for manufacturing the molded article according to the present invention from the polymer composition (for example, for injection molding, the melting temperature of a molding material, a temperature of a mold at the time of the injection of the molding material thereinto, the pressure to be maintained after the mold is filled with the resin composition, and the like).

INDUSTRIAL APPLICABILITY

The present invention is usable to produce a polymer composition suitable for obtaining a resin composition containing a methacrylic ester polymer.

EXPLANATIONS OF LETTERS OR NUMBERS 1 raw material monomer tank (a supply source of a raw material monomer)
3 polymerization initiator tank (a supply source of a polymerization initiator, and the raw material monomer when necessary)
5 pump
7 pump
9 raw material supply line
10 first reactor
11a supply port
11b effluent port
11c another supply port
13 jacket (a temperature regulating means)
14 stirrer
15a connection line
15b replenishing line
16 jacket (a cooling means)
17a two-stage polymerization raw material monomer tank (a supply source of a new raw material monomer and a polymerization initiator)
17b one-stage polymerization raw material monomer tank (a supply source of a new raw material monomer and a polymerization inhibitor)
19a, 19b pump
20 second reactor
21a supply port
21b effluent port
21c another supply port
23 jacket (a temperature regulating means)
24 stirrer
25 effluent line
31 preheater
33 devolatilizing extruder
35 discharge line
37 recovery tank
40 cooler (a cooling means)
50 injection valve
51 plug
52 body
53 shaft
54 introduction port
55 discharge port
56 seal part
57 inner space
T temperature sensor (a temperature detecting means)
V valve
C clearance

The invention claimed is:

1. A continuous polymerization apparatus at least comprising
a first reactor and a second reactor, wherein
each of the reactors comprises a supply port and an effluent port, wherein
the supply port of the first reactor is connected to supply sources of a raw material monomer and a polymerization initiator, wherein
the effluent port of the first reactor is connected to the supply port of the second reactor by a connection line, wherein
the connection line is combined with a replenishing line through an injection valve at a combining part located between the effluent port of the first reactor and the supply port of the second reactor, and wherein
the injection valve in a full closure state thereof comprises a clearance capable of causing a fluid comprising at least the raw material monomer to flow from the replenishing line to the connection line.

2. The continuous polymerization apparatus of claim 1, wherein the injection valve comprises:
a plug;
a body comprising a space that accommodates the plug; and
a shaft that supports and operates the plug in the space, and wherein
in the full closure state, the clearance is formed between an inner wall face of the body and a surface of the plug.

3. The continuous polymerization apparatus of claim 1, wherein an inner volume of the body of the injection valve in the full closure state thereof is 1 to 30% of an inner volume of the body in a full open state of the injection valve.

4. The continuous polymerization apparatus of claim 1, wherein
the replenishing line is connected to a supply source of a raw material monomer and a polymerization initiator and a supply source of a raw material monomer and a polymerization inhibitor, switchably therebetween.

5. The continuous polymerization apparatus of claim 1, wherein
each of the first reactor and the second reactor is a tank type reactor, and wherein
the effluent port of each of the reactors is located at a top of the reactor.

6. The continuous polymerization apparatus of claim 1, wherein
each of the first reactor and the second reactor is a complete mixing type reactor.

7. The continuous polymerization apparatus of claim 1, wherein
each of the first reactor and the second reactor further comprises a temperature detecting means that detects a temperature in the reactor.

8. The continuous polymerization apparatus of claim 1, wherein
the connection line comprises a cooling means.

9. The continuous polymerization apparatus of claim 1, wherein
the connection line comprises a mixing means.

10. The continuous polymerization apparatus of claim 1, wherein
another supply port provided on the second reactor is connected to a supply source of a new polymerization initiator.

11. A production method of a polymer composition using the continuous polymerization apparatus of claim 1, the production method comprising:
a first polymerization step of continuously supplying the raw material monomer and the polymerization initiator from the supply sources of the raw material monomer and the polymerization initiator, to the first reactor, through the supply port of the first reactor to subject the raw material monomer and the polymerization initiator to a continuous polymerization in the first reactor, and continuously taking out an intermediate composition obtained thereby from an effluent port of the first reactor;
a raw material monomer supply step of supplying a fluid comprising at least a raw material monomer from the replenishing line to the intermediate composition through the injection valve in a course of transfer of the intermediate composition from the effluent port of the first reactor to the supply port of the second reactor through the connection line; and
a second polymerization step of continuously supplying a mixture of the intermediate composition taken out from the effluent port of the first reactor and the fluid supplied from the replenishing line through the injection valve, to the second reactor, through the supply port of the second reactor to further subject the mixture to a continuous polymerization in the second reactor, and continuously taking out a polymer composition obtained thereby from an effluent port of the second reactor.

12. The production method of a polymer composition of claim 11, wherein
the fluid comprising at least the raw material monomer further comprises a polymerization initiator.

13. The production method of a polymer composition of claim 11, further comprising:
an intermediate cooling step of continuously cooling at least the intermediate composition using a cooling means of the connection line in a course of transfer of the intermediate composition from the effluent port of the first reactor to the supply port of the second reactor through the connection line.

14. The production method of a polymer composition of claim 11, wherein
a temperature of the mixture at the supply port of the second reactor is lower by 5 to 80° C. than a temperature of the intermediate composition at the effluent port of the first reactor.

15. A production method of a polymer composition using the continuous polymerization apparatus of claim 1, the production method comprising:
a polymerization step of continuously supplying the raw material monomer and the polymerization initiator from the supply sources of the raw material monomer and the polymerization initiator, to the first reactor, through a supply port of the first reactor to subject the raw material monomer and the polymerization initiator to a continuous polymerization in the first reactor, and continuously taking out an intermediate composition obtained thereby from the effluent port of the first reactor;
a raw material monomer supply step of supplying a fluid comprising at least a raw material monomer from the replenishing line to the intermediate composition through the injection valve in a course of transfer of the intermediate composition from the effluent port of the first reactor to the supply port of the second reactor through the connection line; and
a passage step of continuously supplying a mixture of the intermediate composition taken out from the effluent port of the first reactor and the fluid supplied from the replenishing line through the injection valve, to the second reactor, through a supply port of the second reactor for the mixture to pass through the second reactor, and continuously taking out the mixture as a polymer composition from an effluent port of the second reactor.

16. The production method of a polymer composition of claim 15, wherein
at the raw material monomer supply step, the injection valve is used in the full closure state thereof.

17. The production method of a polymer composition of claim 15, wherein
the fluid comprising at least the raw material monomer further comprises a polymerization inhibitor.

18. The production method of a polymer composition of claim 11, wherein
a temperature in the first reactor detected by a temperature detecting means of the first reactor and a temperature in the second reactor detected by a temperature detecting means of the second reactor are within a range from 120 to 180° C., respectively.

19. An injection valve comprising:
a plug;
a body comprising a space to accommodate the plug; and
a shaft that supports and operates the plug in the space, wherein
a clearance is formed between an inner wall face of the body and a surface of the plug in a full closure state of the injection valve.

20. A polymerization apparatus comprising the injection valve of claim 19.

21. A production method of a polymer composition conducted by using of the polymerization apparatus of claim 20.

* * * * *